(12) United States Patent
O'Connell et al.

(10) Patent No.: US 11,120,264 B2
(45) Date of Patent: Sep. 14, 2021

(54) AUGMENTED REALITY INTERFACE FOR FACILITATING IDENTIFICATION OF ARRIVING VEHICLE

(71) Applicant: Apple Inc., Cupertino, CA (US)

(72) Inventors: Alexander J. O'Connell, San Jose, CA (US); Justin M. Strawn, Larkspur, CA (US); Ryan D. Shelby, Mountain View, CA (US); Sunny Chan, San Jose, CA (US); Tadayasu Sasada, Cupertino, CA (US); Vincent P. Arroyo, Union City, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 15/716,662

(22) Filed: Sep. 27, 2017

(65) Prior Publication Data
US 2018/0349699 A1 Dec. 6, 2018

Related U.S. Application Data

(60) Provisional application No. 62/495,601, filed on Jun. 2, 2017.

(51) Int. Cl.
*G06K 9/00* (2006.01)
*G06T 19/00* (2011.01)
(Continued)

(52) U.S. Cl.
CPC ..... *G06K 9/00671* (2013.01); *G01C 21/3438* (2013.01); *G06K 9/00791* (2013.01);
(Continued)

(58) Field of Classification Search
CPC .......................... G06K 9/00671; G09G 5/377
See application file for complete search history.

(56) References Cited

U.S. PATENT DOCUMENTS

| 6,198,431 B1 | 3/2001 | Gibson |
| 9,424,647 B2 | 8/2016 | Flint et al. |
| (Continued) | | |

FOREIGN PATENT DOCUMENTS

| WO | 2015/145139 A1 | 10/2015 |
| WO | 2015/192117 A1 | 12/2015 |

OTHER PUBLICATIONS

Kahney, Leander, "Car Finder iPhone App Uses Augmented Reality to Find Your Wheels." Nov. 4, 2009. 13 pages.
(Continued)

*Primary Examiner* — Yi Yang
(74) *Attorney, Agent, or Firm* — Kilpatrick Townsend & Stockton

(57) ABSTRACT

Various embodiments of the invention pertain to an augmented reality interface for facilitating identification of an arriving vehicle and/or a passenger that improve upon some or all of the above-described deficiencies. According to some embodiments of the invention, a mobile device may be used by a passenger to scan scenery. The mobile device may determine whether and where a requested vehicle is located and display an indicator of the requested vehicle on the mobile device. Similarly, a mobile device may be used by a driver to scan scenery. The mobile device may determine whether and where a passenger is located and display an indicator of the requesting passenger on the mobile device.

23 Claims, 11 Drawing Sheets

(51) Int. Cl.
*G09G 5/377* (2006.01)
*G01C 21/34* (2006.01)
*G06Q 10/06* (2012.01)
*G08G 1/00* (2006.01)
*G06Q 50/30* (2012.01)
*G08G 1/017* (2006.01)

(52) U.S. Cl.
CPC .............. *G06Q 10/06* (2013.01); *G06Q 50/30* (2013.01); *G06T 19/006* (2013.01); *G08G 1/0175* (2013.01); *G08G 1/205* (2013.01)

(56) References Cited

U.S. PATENT DOCUMENTS

| | | | |
|---|---|---|---|
| 2011/0176734 A1* | 7/2011 | Lee | G06K 9/4676 382/197 |
| 2011/0249092 A1* | 10/2011 | Jacobs | G02B 27/017 348/43 |
| 2012/0041675 A1* | 2/2012 | Juliver | G06Q 10/08 701/465 |
| 2012/0105440 A1 | 5/2012 | Lieberman et al. | |
| 2012/0155718 A1* | 6/2012 | Hwang | G06K 9/00288 382/118 |
| 2012/0258741 A1 | 10/2012 | Tillson et al. | |
| 2012/0303263 A1* | 11/2012 | Alam | G01C 21/32 701/410 |
| 2012/0313751 A1* | 12/2012 | Kaelbling | B60N 2/0244 340/5.61 |
| 2013/0050492 A1* | 2/2013 | Lehning | G06K 9/00785 348/148 |
| 2014/0229287 A1 | 8/2014 | Ben-David et al. | |
| 2014/0267399 A1* | 9/2014 | Zamer | H04L 67/20 345/633 |
| 2014/0267411 A1 | 9/2014 | Fein et al. | |
| 2014/0368538 A1 | 12/2014 | Ratcliff et al. | |
| 2015/0248235 A1* | 9/2015 | Offenberg | G06F 3/04847 715/773 |
| 2015/0323327 A1 | 11/2015 | Lord et al. | |
| 2016/0232415 A1* | 8/2016 | L'Heureux | G06K 9/00 |
| 2016/0343032 A1* | 11/2016 | DeWitt | G06Q 30/0261 |
| 2017/0124396 A1 | 5/2017 | Todeschini et al. | |
| 2018/0075287 A1* | 3/2018 | Elswick | G08G 1/202 |

OTHER PUBLICATIONS

Langlois, Christopher et al., "Indoor Localization with Smartphones." IEEE Consumer Electronics Magazine, Oct. 2017 (publication date Sep. 22, 2017.) pp. 70-80.

* cited by examiner

AUGMENTED REALITY INTERFACE FOR FACILITATING IDENTIFICATION OF ARRIVING VEHICLE

CROSS-REFERENCES TO RELATED APPLICATIONS

The present application claims the benefit of and priority to U.S. Provisional Application No. 62/495,601, filed Jun. 2, 2017, the entire contents of which are incorporated herein by reference for all purposes.

BACKGROUND

Mobile apps are helpful for requesting a car to provide transportation. But, high usage of such mobile apps can cause confusion in an urban environment where there are many cars and where other people may also be waiting on a car. It is a common mistake for a passenger to get into a wrong car. Similar problems can also occur with other modes of transportation. For example, it may be difficult for a person to identify the correct bus at a bus terminal, particularly in a foreign country that uses a different language.

Similarly, the driver of a vehicle can have difficulty in identifying a potential passenger or a specific stopping point to pick up the passenger. A pin or dot identifying a GPS coordinate may not provide sufficient accuracy in a crowded environment.

Therefore, it is desirable to provide devices that can assist in identifying the correct vehicle that a passenger is waiting to enter.

BRIEF SUMMARY

Various embodiments of the invention pertain to an augmented reality interface for facilitating identification of an arriving vehicle and/or a passenger that improve upon some or all of the above-described deficiencies. According to some embodiments of the invention, a mobile device may be used by a passenger to scan scenery. The mobile device may determine whether and where a requested vehicle is located and display an indicator of the requested vehicle on the mobile device. Similarly, a mobile device may be used by a driver to scan scenery. The mobile device may determine whether and where a passenger is located and display an indicator of the requesting passenger on the mobile device. As used herein, an "indicator" or "identifier" may include any computer-generated visual data and/or audio data presented to a user in conjunction with an image of a real world object.

In some embodiments, a method of providing an augmented view on a display of a mobile device to identify an arriving vehicle is provided. The method is performed by a mobile device having a camera communicably coupled with the display. The method comprises storing vehicle information about a first vehicle for a user of the mobile device. The vehicle information provides a set of one or more characteristics of the first vehicle. The method further comprises activating an augmented reality mode that uses the camera of the mobile device. The method further comprises receiving image data from the camera. The image data includes the first vehicle. The method further comprises analyzing the image data to search for the set of one or more characteristics in the image data. The method further comprises identifying the first vehicle using the at least one characteristic. The method further comprises providing, on the display of the mobile device, an indication of the first vehicle.

In some embodiments, a method of providing an augmented view on a display of a mobile device associated with an arriving vehicle is provided. The method is performed by a mobile device having a camera communicably coupled with the display. The method comprises receiving a request associated with a user device of a user that has requested transportation. The method further comprises receiving visual information about the user or an environment around the user. The visual information provides a set of one or more characteristics about the user or an environment around the user. The method further comprises activating an augmented reality mode that uses the camera of the mobile device. The method further comprises receiving image data from the camera of the mobile device. The method further comprises analyzing the image data to search for the set of one or more characteristics of the visual information. The method further comprises identifying at least one characteristic of the set of one or more characteristics in the image data. The method further comprises matching the visual information with the image data based on the identifying of the at least one characteristic. The method further comprises providing an identifier on the display to indicate a location corresponding to the user.

In some embodiments, a device is provided. The device comprises one or more processors and a non-transitory computer-readable medium containing instructions that, when executed by the one or more processors, cause the one or more processors to perform operations including the steps of the above methods, for example.

In some embodiments, a computer-program product is provided. The computer-program product is tangibly embodied in a non-transitory machine-readable storage medium of a host device, including instructions that, when executed by one or more processors, cause the one or more processors to perform operations including the steps of the above methods, for example.

The following detailed description together with the accompanying drawings in which the same reference numerals are sometimes used in multiple figures to designate similar or identical structural elements, provide a better understanding of the nature and advantages of the present disclosure.

DETAILED DESCRIPTION

Figure 1:
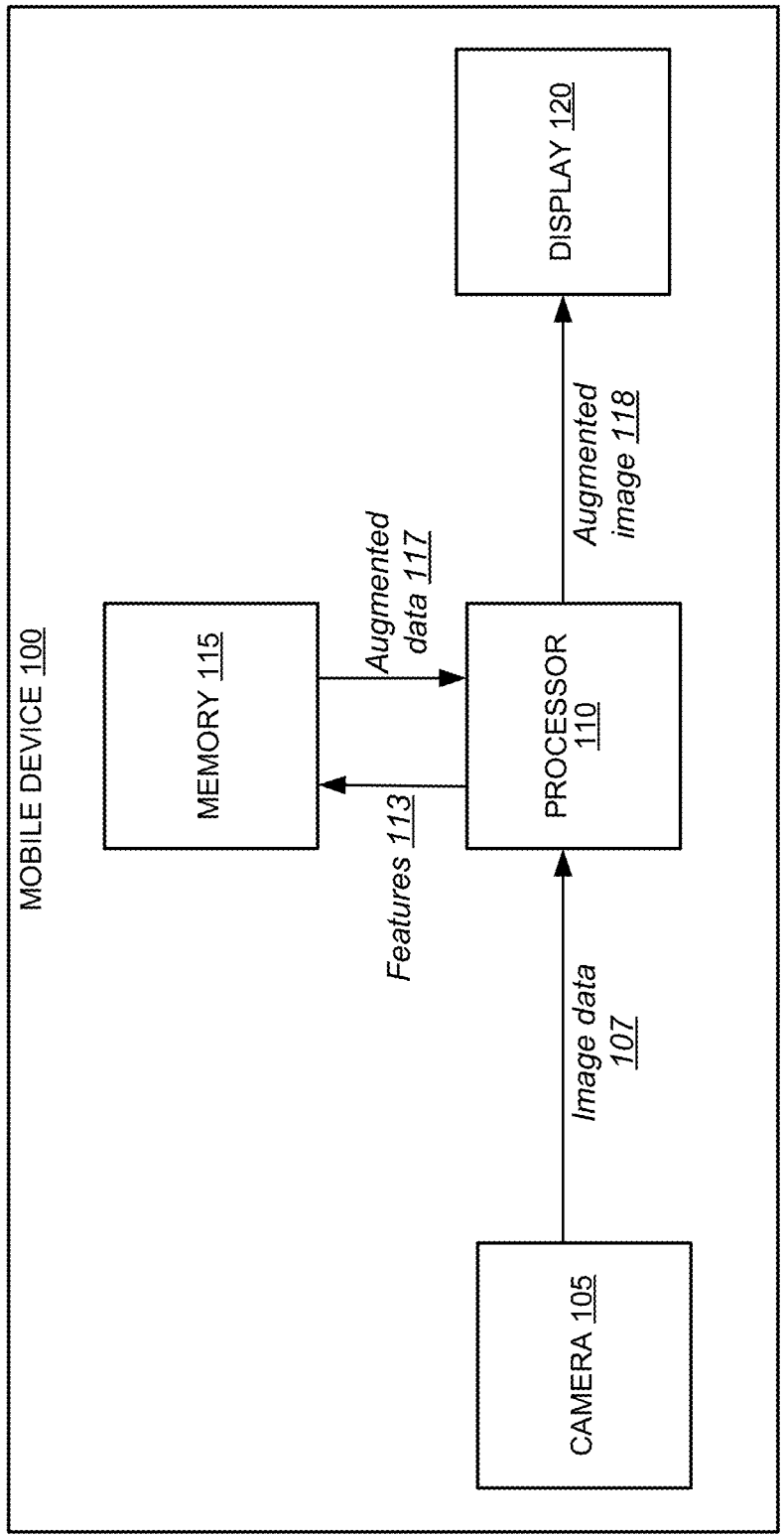
FIG. 1 shows a block diagram depicting a mobile device implementing augmented reality according to some embodiments of the present invention.

Embodiments of the present invention provide for an augmented reality interface that facilitates identification of a vehicle or a passenger. The augmented reality interface may be implemented in association with a transportation requesting service or application. For example, the augmented reality interface may be used by the driver of a hired vehicle to identify the passenger that hired the vehicle from a crowd. Similarly, the augmented reality interface may be used by a passenger requesting a hired vehicle to identify the hired vehicle from a line of vehicles outside a sporting event. The identification of the hired vehicle and the passenger may be made by enhancing images captured by the camera of a mobile device to include an indicator or identifier.

Embodiments of the present invention provide for a number of advantages. Oftentimes, a large number of users may request transportation at the same time and at the same place, such as at an office during rush hour or at a venue when an event concludes. Thus, multiple users awaiting transportation may be at approximately the same address or location. In one example, these users may only provide the address of their location, which may be insufficient for a driver to identify the particular passenger that hired him. Alternatively or additionally, these users may allow the GPS of their mobile device to communicate their location, either directly or indirectly, to the driver. Although potentially more accurate than an address, GPS coordinates may have some degree of error that fails to account for or detect small variances between the locations of different users (e.g., 40 feet north of a building entrance versus 10 feet west of the building entrance). Thus, the requesting passenger may not be at the exact location identified by the GPS.

According to some embodiments of the present invention, visual information about the requesting passenger may be collected that define characteristics of the passenger. Thus, when approaching a location, a driver may scan the location with the camera of his mobile device to generate image data, allowing the mobile device to identify the characteristics of the passenger, and thus identify the passenger, within the image data. In some embodiments, the characteristics of the passenger may be unique, such that multiple passengers are not identified (e.g., using a pink hat, white T-shirt, jeans, and white tennis shoes, as opposed to only using a white T-shirt).

Similarly, a large number of hired vehicles may be located at the same place at the same time, such as outside a hotel, at an airport, or at a venue when an event concludes. In some embodiments, when approaching a location to meet a hired vehicle, a passenger may scan the location with the camera of her mobile device to generate image data, allowing the mobile device to identify characteristics of the hired vehicle, and thus identify the hired vehicle, within the image data. The characteristics of the hired vehicle may be unique, such that multiple vehicles are not identified (e.g., using a license plate number and vehicle make and model, as opposed to only using a vehicle color).

According to some embodiments of the present invention, a set of characteristics of the hired vehicle may be collected. Thus, when approaching a location, a passenger may scan the location with the camera of his mobile device to generate image data, allowing the mobile device to identify the characteristics of the hired vehicle, and thus the hired vehicle, within the image data. In some embodiments, the characteristics of the hired vehicle may be unique, such that multiple hired vehicles are not identified (e.g., using a black Toyota Corolla with license plate 12345678, as opposed to only using a Toyota Corolla).

I. Augmented Reality

Augmented reality describes a technology in which a live view of the real world is supplemented with computer-generated data, such as text, graphics, or audio. In other words, the real world as seen by an augmented reality device is enhanced with additional features. With the use of augmented reality, the real world may become interactive and informative. For example, information about an object in a real-world scene may be overlaid onto the real-world scene to provide the user with more information about the viewed object.

In some embodiments, augmented reality may be implemented on a mobile device. FIG. 1 shows a block diagram depicting a mobile device 100 implementing augmented reality according to some embodiments of the present invention. In some embodiments, the mobile device 100 may be a communication device that may provide remote communication capabilities to a network. Examples of remote communication capabilities include using a mobile phone (wireless) network, wireless data network (e.g., 3G, 4G or similar networks), WiFi, Wi-Max, or any other communication medium that may provide access to a network such as the Internet or a private network. Examples of mobile devices 100 include mobile phones (e.g., cellular phones), PDAs, tablet computers, net books, laptop computers, personal music players, handheld specialized readers, watches, fitness bands, wearables, etc., as well as automobiles with remote communication capabilities. The mobile device 100 may comprise any suitable hardware and software for performing such functions, and may also include multiple devices or components (e.g., when a device has remote access to a network by tethering to another device—i.e., using the other device as a modem—both devices taken together may be considered a single communication device).

The mobile device 100 may include hardware components, such as a camera 105, a processor 110, a memory 115, and a display 120. Although illustrated and described as being internal to the mobile device 100, it is contemplated that any or all of these hardware components may alternatively or additionally be implemented external to and/or remote from the mobile device 100. To implement augmented reality, the camera 105 may be used to capture image data 107 of a live, real-world view. For example, the camera 105 may capture a live, moveable image of the environment positioned in front of the camera 105 at a given moment. The camera 105 may transmit the image data 107, as a single live image or a stream of live images, to the processor 110.

The processor 110 may process the image data 107 to extract features 113 from the image data 107. The processor 110 may analyze the image data 107 to determine whether particular objects are present in the image data 107. For example, the processor 110 may run a classifier on the image data 107 to identify images of people in the image data 107 based on common features of people (e.g., a head, a face, a body, arms, legs, hands, feet, typical movement profiles, etc.). Similarly, the processor 110 may run a classifier on the image data 107 to identify other particular objects present in the image data 107. These identified objects may be passed as features 113 to the memory 115.

The processor 110 may use the features 113 to retrieve augmented data 117 from the memory 115. For example, a feature 113 may be "dog". As facilitated by the processor 110, the memory 115 may be searched for database entries corresponding to "dog". One or more of the database entries may be passed back to the processor 110 as augmented data 117. The augmented data 117 may include any data relevant to the features 113, such as text (e.g., a description, a definition, a website address, etc.), a graphic, audio, video, an interactive element, and/or the like.

The processor 110 may receive the augmented data 117 and overlay the augmented data 117 onto the image data 107. The augmented data 117 may specify the features 113 to which the augmented data 117 is relevant. Thus, the processor 110 may locate the features 113 in the image data 107 and overlay the augmented data 117 at a particular location. As examples, the particular location may be proximate to the relevant feature 113, be overlapping with the relevant feature 113, be associated with the relevant feature 113 (e.g., with an arrow, point, or other indicator to the feature 113), be in a popup box or window, and/or the like.

The image data 107 with the overlaid augmented data 117 may together form an augmented image 118 that is transmitted to the display 120. The display 120 may display the augmented image 118 on the mobile device 100. In some embodiments, the display 120 may allow interaction with the augmented image 118, such as zooming in, zooming out, cropping, selecting a link (e.g., to a website or file), modifying, editing, and/or the like. This interaction may be facilitated by an input element (not shown) that provides input commands to the processor 110, such as a touchscreen element incorporated into the display, a mouse, a trackpad, a trackball, a keyboard, a microphone, and/or the like.

II. Passenger Mode

A mobile device can assist in identifying the correct vehicle for a passenger waiting for the vehicle to arrive. In some embodiments, the passenger can request the vehicle using an app on the mobile device. In other embodiments, the passenger may want to use public transportation and may map a route and identify a public transportation option (e.g., a bus and bus number, a subway and subway line, etc.) using a map application, where the bus or other public transportation can be the vehicle.

An augmented reality mode can use received data (e.g., over a network via the application or broadcast from the other device) to identify the correct vehicle in images captured by a camera of the mobile device. As examples, the vehicle data can be a license plate number of the vehicle, a color of the vehicle, a manufacturer and model of the vehicle, and a destination of the vehicle displayed on the vehicle (e.g., as may be done on a bus). The vehicle data can be obtained in a variety of ways. For example, a car request app can receive vehicle data once a particular driver has accepted the request for the ride. As another example, data about a bus can be obtained from a ticket stored in a wallet app on a mobile device.

In some embodiments, as part of the AR process, the request app can send a notification to the mobile device that the car has arrived. In response to the notification, an augmented reality (AR) mode of the mobile device can be enabled. The enabling of the AR mode can allow the mode to be activated in ways that may not otherwise be available to the user. The AR mode can be activated by a user in a variety of ways, e.g., by selection of a button or a specified gesture of the mobile device. As an example, the gesture can be an upward motion of the device from a horizontal position to a vertical position such that a camera can provide images of a road near the passenger, or vice versa. Specifically, a user interact with the display of his mobile device in a near horizontal position (e.g., with the display of the mobile device facing up), then may raise the mobile device to a near vertical position as if he were taking a photograph or using the camera of the mobile device, which may activate the AR mode. In some embodiments, the gesture may be sensed by one or more sensors of the mobile device, e.g., an accelerometer, a gyroscope, etc.

The AR mode can analyze images taken by the camera, e.g., via a textual analysis of characters recognized in the image and/or object recognition. The object recognition can analyze the images to identify objects that are sufficiently large to correspond to a vehicle, and then perform further analysis of the objects identified vehicles to determine if one matches the vehicle data. Machine learning models can be used for the object recognition, as well as the analysis of textual data or classification of a car based on color or make/model (e.g., a shape corresponding to the make/model). For instance, the make and model of a car can be identified by comparing to a database of car images of that particular make and model or by use of a machine learning model that is trained on different images of vehicles. The indication of the vehicle can be shown in a variety of ways, e.g., by highlighting the vehicle or with an arrow pointing at the vehicle. In some embodiments, the vehicle may be indicated via the enhancing of colors around the vehicle, increasing contrast around the vehicle, displaying the vehicle in color while the background is in black and white, displaying a glow or halo around the vehicle, combinations thereof, and/or the like.

The AR mode can work in combination with regular map view. For instance, the map can provide an indicator of a direction that the user is facing. When the vehicle is arriving (e.g., as indicated by a notification from a driver device), the mobile device can have the AR mode enabled. A cue can be provided to the user that the AR mode is enabled, and instructions may be provided to the user to move the mobile device and position to use the camera to provide the AR view. In the gesture of raising the mobile device from a horizontal position to a vertical position (or vice versa), the mobile device can switch to the AR view and begin to use the camera to identify the correct vehicle.

A. System of Driver Device, Server, and Passenger Device

Figure 2:
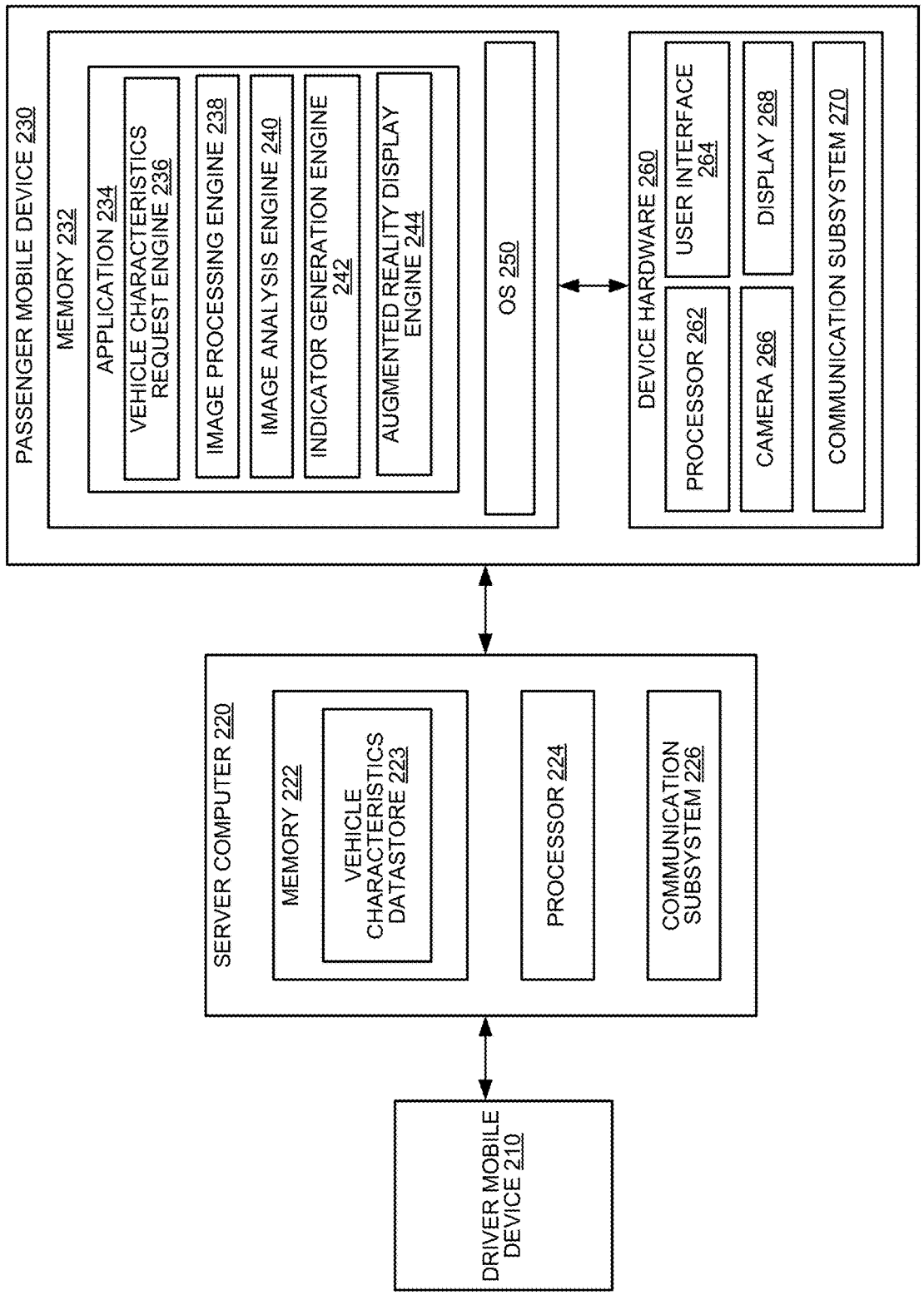
FIG. 2 shows a block diagram depicting an augmented reality system for facilitating identification of an arriving vehicle according to some embodiments of the present invention.

FIG. 2 shows a block diagram depicting an AR system for facilitating identification of an arriving vehicle according to some embodiments of the present invention. The AR system may include a driver mobile device 210, a server computer 220, and a passenger mobile device 230. Each of the driver mobile device 210, the server computer 220, and the passenger mobile device 230 may be in operative communication with each other, such as over one or more networks. The driver mobile device 210 and/or the passenger mobile device 230 may be a mobile device 100, as described with respect to FIG. 1.

The driver mobile device 210 may receive input corresponding to vehicle information of the vehicle of which the driver is operating. In some embodiments, this input may be received as part of an initial registration process of the driver with the server computer 220, and the vehicle information may thereafter be associated with the driver mobile device 210 for future requested trips. In some embodiments, this input may be received before each requested trip from the driver mobile device 210. Such embodiments may be desirable, for example, with respect to drivers that own or lease multiple vehicles, drivers that rent vehicles, drivers that share vehicles (e.g., a taxicab driver not assigned to a particular taxicab), and/or the like.

The vehicle information may include a set of one or more characteristics of the vehicle. The characteristics may include a vehicle make (or manufacturer), a vehicle model, a vehicle model year, a vehicle type (e.g., car, sedan, hatchback, convertible, sport utility vehicle, pickup truck, limousine, etc.), a number of doors, a license plate number, a license plate state (e.g., a California license plate), a vehicle identification number, a vehicle photograph, and/or the like. The characteristics may be provided by the driver mobile device 210 to the server computer 220.

The server computer 220 may include a memory 222, a processor 224, and a communication subsystem 226. The communication subsystem 226 may enable the server computer 220 to communicate with the driver mobile device 210 and/or the passenger mobile device 230. The memory 222 may include a vehicle characteristics datastore 223. The vehicle characteristics datastore 223 may store the vehicle characteristics received from the driver mobile device 210 in association with a driver identifier (e.g., a driver name, a driver phone number, etc.). The vehicle characteristics datastore 223 may further store and match supplemental characteristics not provided by the driver mobile device 210. For example, the vehicle characteristics datastore 223 may store images of vehicles of a variety of different makes, models, and years. These images may be sourced from other driver mobile devices, vehicle manufacturers, the Internet, etc. Thus, a provided vehicle make, model, and year may be supplemented with a vehicle image. In another example, when the driver mobile device 210 provides a photograph of a vehicle to the server computer 220 as vehicle information, the processor 224 may execute a search of the vehicle images in the vehicle characteristics datastore 223 in order to identify characteristics of the vehicle based on the photograph, such as a make, model, and year, in some embodiments.

In some examples, the driver mobile device 210 may provide the server computer 220 with a vehicle identification number or license plate number and state. The server computer 220 may use this information to query one or more remote databases (not shown) storing public records (e.g., records of the Department of Motor Vehicles) in order to obtain supplemental vehicle characteristics. For example, the license plate number and state of a vehicle may be used by the server computer 220 to obtain a vehicle make, model, year and color.

The server computer 220 may be in communication with a passenger mobile device 230. The passenger mobile device 230 may include a memory 232 and device hardware 260.

The device hardware 260 may include a processor 262, a user interface 264, a camera 266, display 268, and a communication subsystem 270. In some embodiments, the display 268 forms part of the user interface 264. The user interface 264 may further include input elements, such as a keyboard, a trackball, a trackpad, a mouse, a microphone, etc. The communication subsystem 270 may include hardware components configured to allow the passenger mobile device 230 to communicate with the server computer 220, such as over a network.

The memory 232 may include an operating system 250. The operating system 250 may provide an interface for a passenger to use the passenger mobile device 230, e.g., to operate device hardware 260 and to execute application 234. The application 234 may include a plurality of engines for facilitating the AR functions of the passenger mobile device 230. For example, the application 234 may include a vehicle characteristics request engine 236, an image processing engine 238, an image analysis engine 240, an indicator generation engine 242, and an augmented reality display engine 244. Although shown and described as having a certain number of separate engines, it is contemplated that the application 234 may include a greater or fewer number of engines, and/or that the functions of multiple engines described herein may be combined.

Although not shown in FIG. 2, it is contemplated that the passenger mobile device 230 may have a separate transportation request application in communication with the application 234. In some embodiments, the transportation request application may integrate a number of additional engines into the application 234. The transportation request application may allow the passenger mobile device 230 to transmit a request for transportation to server computer 220 (or another remote server computer). Based on any of a number of factors (e.g., pickup location, destination location, time of request, etc.), the server computer 220 may match the passenger using passenger mobile device 230 to a driver (in this case, the driver using the driver mobile device 210).

In some embodiments, once the passenger has been matched to the driver, the driver mobile device 210 may be prompted to provide vehicle information including vehicle characteristics, as described above. In some embodiments, the passenger mobile device 230 may be notified of the match and may transmit a request back to the server computer 220 via the vehicle characteristics request engine 236 for the vehicle characteristics associated with the matched driver. The request may include an identifier of the driver, e.g., a driver name, a driver nickname, a driver screen name, a driver phone number, etc. Server computer 220 may then retrieve the applicable vehicle characteristics from the vehicle characteristics datastore 223, supplement the vehicle characteristics in some embodiments, and transmit the vehicle characteristics to the passenger mobile device 230 via the communication subsystem 226. In other examples, the vehicle characteristics can be automatically sent to the passenger mobile device 230 in the message indicating a match has been found.

In some embodiments, the driver mobile device 210, the server computer 220 and/or the passenger mobile device 230 may determine that the driver mobile device 210 and the passenger mobile device 230 are within a threshold distance of each other (e.g., fifty feet) indicating arrival. In one example, this determination may be made after a certain period of time has elapsed since the passenger mobile device 230 requested the vehicle (e.g., the expected amount of time for the driver to get to the location of the passenger mobile device 230). In another example, this determination may be made using the locations of the driver mobile device 210 and/or the passenger mobile device 230 (e.g., an entered address, using GPS coordinates, using WiFi data, using cell tower triangulation, using proximity sensors, using Bluetooth pings, etc.).

Once the driver mobile device 210 and the passenger mobile device 230 are determined to be within a threshold distance of one another, the passenger mobile device 230 may prompt the passenger via display 268 to raise the passenger mobile device 230 and orient the camera 266 toward the surrounding environment. The camera 266 may then be used to capture image data of the surrounding environment. The image data may be passed to the image processing engine 238. The image data may be transmitted as a single image, as a video, and/or or as a stream of images in real time.

The image processing engine 238 may, in conjunction with the processor 262, receive the image data and process it to identify one or more features. For example, the image processing engine 238 may use outlines, edges and colors to identify separate objects in the image data. In some embodiments, the image processing engine 238 may remove objects that do not correspond to vehicles (e.g., objects that do not have wheels, objects that have the wrong dimensions, etc.). In some embodiments, the image processing engine 238 may optimize the image data, such as by adjusting lighting, shadows, sharpness, etc.

The image processing engine 238 may transmit the processed image data to the image analysis engine 240. The image analysis engine 240 may receive the vehicle characteristics and analyze the processed image data to search for the characteristics. For example, the image analysis engine 240 may perform comparisons between a vehicle image received from the vehicle characteristics datastore 223 and vehicles in the processed image data. These comparisons may be made based on particular characteristics of the vehicle (e.g., body style, color, body molding, license plate state, license plate number, etc.), which may be relatively unique to a particular vehicle. In some embodiments, a percentage match may be generated for each vehicle present in the processed image data based on the number of matching characteristics, and the vehicle with the highest percentage match may be identified as the requested vehicle. In some embodiments, a vehicle may only be identified if its match percentage is above a certain threshold (e.g., a 70% threshold may mean that a 95% match may be identified, while neither a 40% match nor a 50% match would be identified in another example).

In some embodiments, these comparisons and identifications may be made using a machine learning model. For example, a machine learning model may be trained by using photographs of different vehicles and other characteristics. The vehicle in the processed image data may be processed by the machine learning model to predict vehicle characteristics (e.g., year, make and model of the vehicle) that may be compared to the vehicle characteristics reported by or associated with the driver.

The image analysis engine 240 may identify the matching vehicle to the indicator generation engine 242. For example, the image analysis engine 240 may provide a location (e.g., pixel addresses, coordinates, etc.) in the image data corresponding to the matched vehicle. In the case of streaming image data, the image analysis engine 240 may provide a description of characteristics in the image data corresponding to the matched vehicle (e.g., red vehicle with black interior), as the pixel addresses of the matched vehicle may change. Once the location of the matched vehicle is identified, the indicator generation engine 242 may generate an indicator identifying the matched vehicle to be overlaid on the image data. The indicator may include, for example, a text box, an arrow, a bubble, a circle, a highlight, a contrasting color, etc.

In some embodiments, the indicator generation engine 242 may further generate indicators before a matched vehicle is identified or when a matched vehicle is not identified. For example, the indicator generation engine 242 may generate a text box indicating to the passenger that the camera needs to be reoriented in order to identify a matched vehicle, as described further herein. In another example, the indicator generation engine 242 may generate a text box indicating to the passenger that no vehicle has been matched in the image data.

The augmented reality display engine 244 may receive the indicator from the indicator generation engine 242, as well as the location of the matched vehicle (if a match is found). The augmented reality display engine 244 may overlay the indicator onto the image data at or in proximity to the location of the matched vehicle. For example, an arrow may point at the center of the image of the matched vehicle, or a circle may be placed around the entirety of the matched vehicle.

B. Method for Passenger Mode

Figure 3:
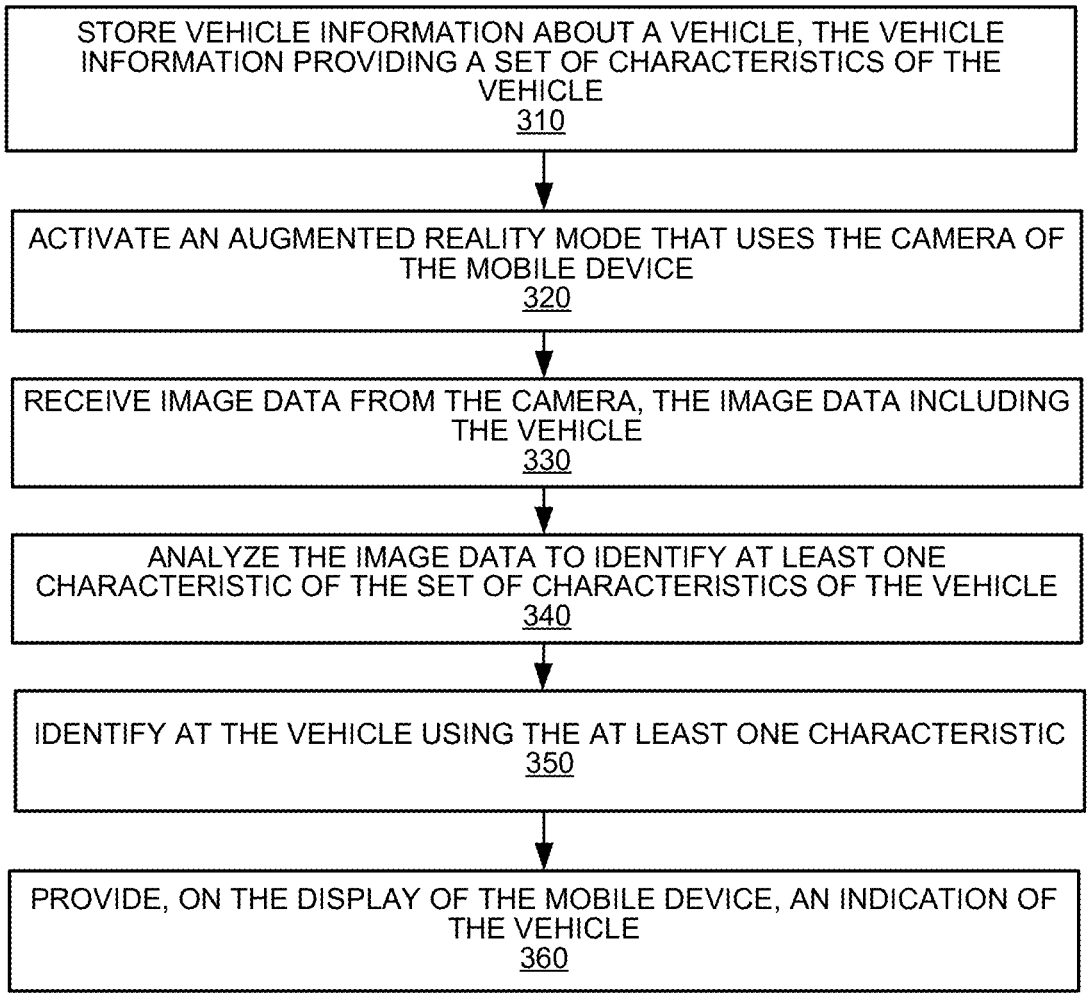
FIG. 3 shows a flowchart depicting a method for facilitating identification of an arriving vehicle using augmented reality according to some embodiments of the present invention.

FIG. 3 shows a flowchart depicting a method for facilitating identification of an arriving vehicle at a location using augmented reality according to some embodiments of the present invention. The method can be performed by the passenger mobile device 230.

At step 310, vehicle information about a vehicle is stored for a user of a mobile device. The vehicle information may provide a set of one or more characteristics of the vehicle. The set of one or more characteristics may include a license plate number of the vehicle, a color of the vehicle, a manufacturer and model of the vehicle, and a destination of the vehicle. In some embodiments, the vehicle information is received in response to a request for a vehicle submitted via a network connection of the mobile device via an app executing on the mobile device.

At step 320, an augmented reality mode may be activated and use the camera of the mobile device. The camera may be internal to the mobile device or external to and communicatively coupled with the mobile device. In some embodiments, before the augmented reality mode is activated, an indication is received that the vehicle has arrived at the location. The augmented reality mode may then be activated in response to the indication that the vehicle has arrived. In some embodiments, the augmented reality mode is activated by a gesture that moves the mobile device (e.g., a move from a horizontal orientation to a vertical orientation or vice versa).

At step 330, image data is received from the camera. The image data may be generated in response to a user taking images and/or video of a scene with the camera. The image data may include the vehicle. In some embodiments, the image data may include a plurality of vehicles (e.g., the vehicle and one or more other vehicles).

At step 340, the image data is analyzed to identify at least one characteristic of the set of one or more characteristics of the vehicle. For example, if the set of one or more characteristics includes a license plate number, the image data may be searched for text corresponding to the license plate number. If the set of one or more characteristics includes a particular color, the image data may be searched for a vehicle that is that color. If the set of one or more characteristics include a year and model, the image data may be searched for the body style and/or body molding associated with a vehicle that year and model. In some embodiments, the set of one or more characteristics of the vehicle may include proximity data (e.g., distance of the vehicle from the mobile device).

The set of one or more characteristics may include a vehicle make, a vehicle model, a vehicle year, a vehicle color, and a number of doors. The vehicle make, vehicle mode, vehicle year, and number of doors may be identified in the image data. In some embodiments, not all of the set of one or more characteristics may need to be found in the image data. By allowing less than all of the characteristics to be identified, some embodiments may allow for certain differences (e.g., a car color changing due to painting, a license plate number mismatch due to a move from one state to another state, a body molding mismatch due to an accident, etc.). With respect to proximity data as the characteristic, the location of the vehicle in the image may be identified based on the distance of the vehicle from the mobile device. For instance, the image data may be searched to find a semi-circle corresponding to the proximity (i.e., distance).

At step 350, the vehicle is identified using the at least one characteristic. In some embodiments, the vehicle is identified by selecting the vehicle from among the plurality of vehicles based on the at least one characteristic corresponding to the vehicle and not to the other vehicles of the plurality of vehicles. For example, the vehicle may be identified because it is red, while the other vehicles are other colors. With respect to proximity data as the characteristic, a particular location on the semi-circle may be identified (e.g., using multiple measurements), thereby identifying the vehicle. Further details regarding the use of proximity data can be found in section IV.

At step 360, an indication of the vehicle is provided on the display of the mobile device. The indication may be made in any suitable form that identifies the vehicle. For example, the indication may include an arrow, an X, a circle or other geometric shape surrounding the vehicle, a line, a highlighted area including the vehicle, a shadowed area excluding the vehicle, etc.

C. Graphical User Interface

Figure 4:
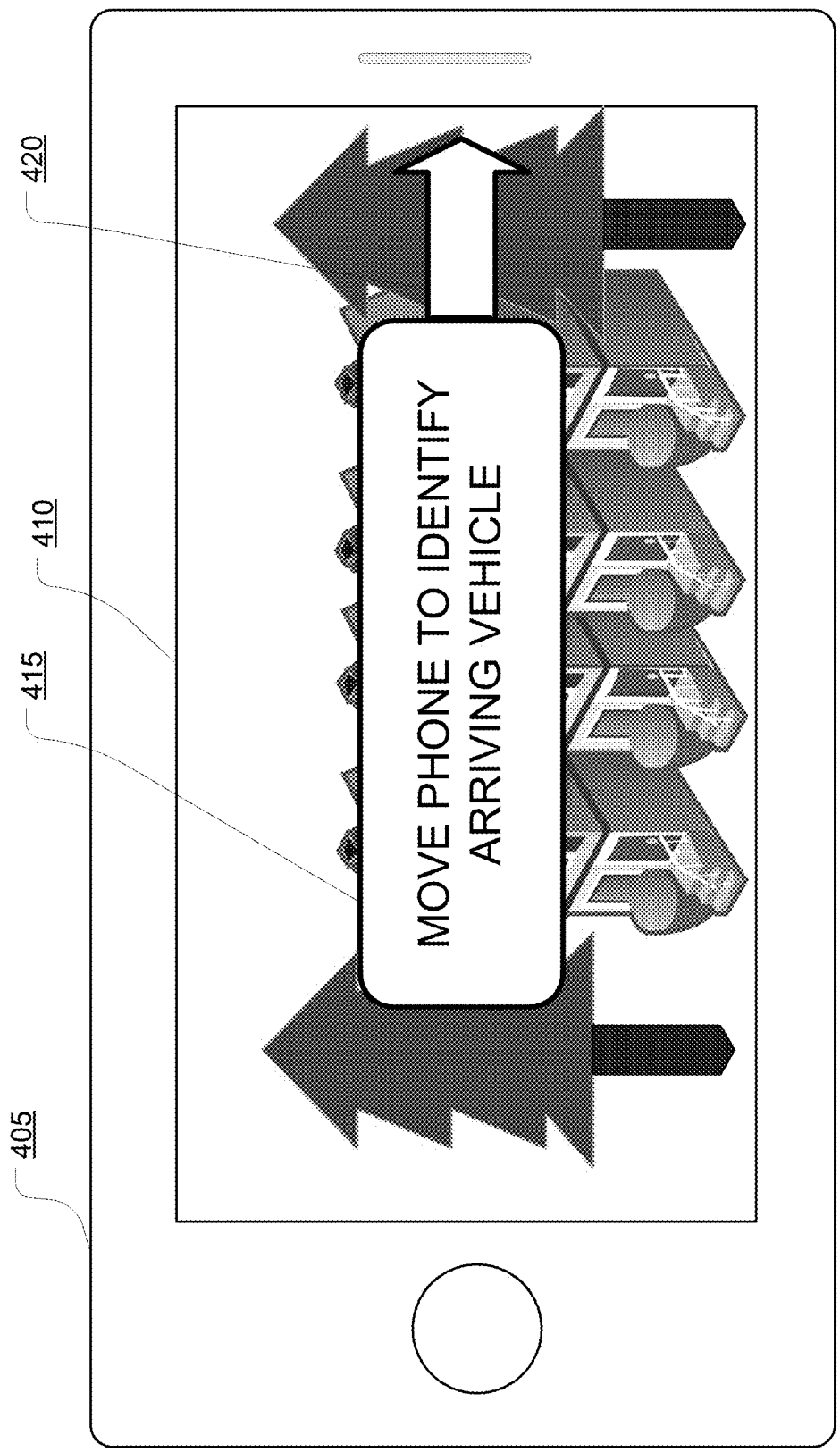
FIG. 4 shows a graphical user interface on the display of a mobile device depicting instructions to activate an augmented reality mode according to some embodiments of the present invention.

FIG. 4 shows a graphical user interface on the display 410 of a mobile device 405 depicting instructions to activate an augmented reality mode according to some embodiments of the present invention. The mobile device 405 may be the passenger mobile device 230 of FIG. 2 and/or the mobile device 100 of FIG. 1. The display 410 may form part of the device hardware of the mobile device 405, and may be similar to display 268 of FIG. 2.

The display 410 may show an augmented image. The augmented image may include image data corresponding to a real time image (e.g., video or photos) captured by the camera (not shown) of the mobile device 405. The augmented image may also include augmented data. The augmented data may include a text box 415 and an arrow 420 in one example. In other examples, the augmented data may include text box 415 or arrow 420, either alone or in combination with other augmented data.

To arrive at the augmented image shown on display 410, a passenger may make a gesture with the mobile device 405 (e.g., raising the mobile device 405 to face the passenger, placing the mobile device 405 in a landscape orientation, activating the camera, combinations thereof, etc.). In response to detecting the gesture, the mobile device 405 may activate an augmented reality mode. Upon activation of the augmented reality mode, a live, real world image may be shown on display 410.

Based on the image shown on display 410 (and/or based on other data, such as proximity data), the mobile device 405 may select augmented data to be shown on the display 410. For example, the mobile device 405 may display the text box 415 (with a message stating "MOVE PHONE TO IDENTIFY ARRIVING VEHICLE") in order to indicate to the passenger that no vehicles (or no matching vehicles) are currently being shown on the display 410. The augmented data may also include an arrow 420, indicating to the passenger that the passenger should turn to the right to try to locate the arriving vehicle. The mobile device 405 may know in which direction to orient the mobile device 405 based on, for example, a direction or location of propagated signals (e.g., pings) received from the driver mobile device and/or a compass of the mobile device.

A "ping" as used herein may refer to a query sent from one mobile device to another mobile device to determine whether a connection is present. A connection may be present, for example, when the mobile devices are within communication range using a particular protocol (e.g., within 100 meters for Bluetooth), but may not be present when the mobile devices are not within communication range. A ping may be used to determine the location of a mobile device through signal strength. For example, the strength of signals from the mobile device to multiple cellular towers may be used to triangulate the location of the mobile device. Similarly, the strength of multiple pings at multiple locations from one mobile device to another mobile device may be used to triangulate the location of the mobile device. The direction of the pings, and thus the mobile device, may be inferred from a direction of movement in the location of the pings.

Further, the orientation and angle of the mobile device may be determined by one or more of a number of sensors included in or associated with the mobile device, such as a gyroscope or compass. For example, the compass may indicate that the mobile device is facing north, while pings may indicate that the vehicle is south of the mobile device. In another example, the mobile device 405 may perform image analysis to determine that no road or parking lot is shown on the display 410, and direct the mobile device 405 to turn to face the nearest road or parking lot based on map information. A ping message (e.g., an advertisement signal) may include an identifier of the sending device, thereby allowing the receiving device (e.g., the passenger's device) to identify a particular ping of the sending device from among many other signals of other devices. The identifier can be a characteristic sent to the passenger's device via a server.

Figure 5A:
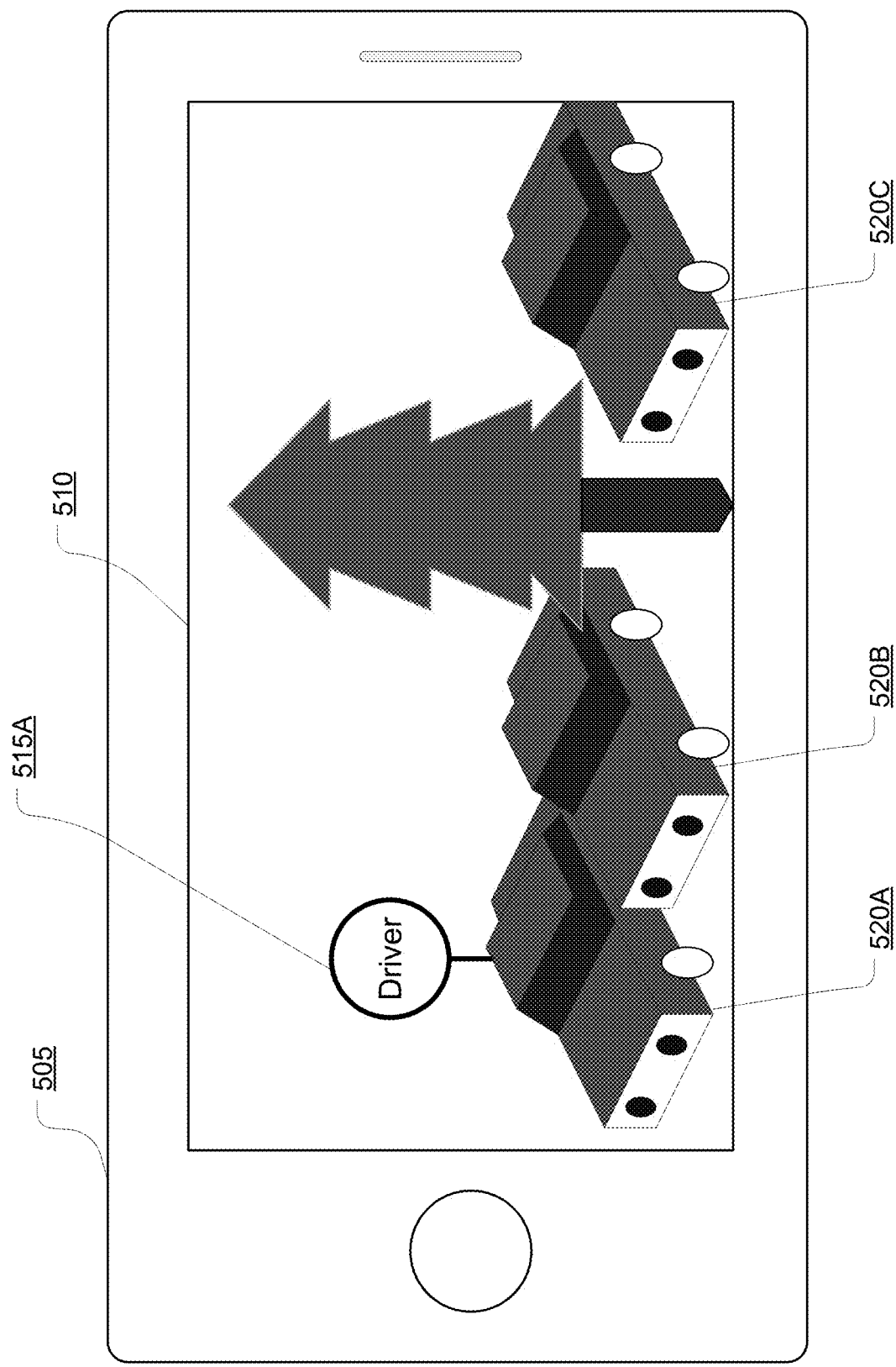
FIG. 5A shows a graphical user interface on the display of a mobile device depicting identification of an arriving vehicle using augmented reality according to some embodiments of the present invention.

FIG. 5A shows a graphical user interface on the display 510 of a mobile device 505 depicting identification of an arriving vehicle using augmented reality according to some embodiments of the present invention. The embodiment of FIG. 5A uses a pin as an indicator 515A. The mobile device 505 may be the mobile device 405 of FIG. 4, the passenger mobile device 230 of FIG. 2, and/or the mobile device 100 of FIG. 1. The display 510 may form part of the device hardware of the mobile device 505, and may be similar to display 268 of FIG. 2 and/or display 410 of FIG. 4.

The display 510 may show an augmented image. The augmented image may include image data corresponding to a real time image captured by the camera (not shown) of the mobile device 505. In the example shown in FIG. 5A, the image data includes three vehicles: vehicle 520A, vehicle 520B, and vehicle 520C. The augmented image may also include augmented data. The augmented data may include an indicator 515A. The indicator 515A includes a circle with the text "Driver" in it and a line connecting the vehicle 520A to the circle. In some examples, the augmented data may include other indicators, alternatively or additionally.

To arrive at the augmented image shown on display 510, a passenger may make a gesture with the mobile device 505 (e.g., raising the mobile device 505 to face the passenger, placing the mobile device 505 in a landscape orientation, activating the camera, combinations thereof, etc.). In response to detecting the gesture, the mobile device 505 may activate an augmented reality mode. Upon activation of the augmented reality mode, a real time image may be shown on display 510.

Based on the image shown in display 510 (and/or based on other data, such as proximity data, as discussed further herein), the mobile device 505 may select augmented data to be shown on the display 510. For example, the mobile device 505 may analyze the image data to identify vehicle 520A based on one or more characteristics of the vehicle reported by the driver of the vehicle. In some embodiments, identifying vehicle 520A may be performed by excluding vehicles 520B and 520C as having the one or more characteristics. The mobile device 505 may display the indicator 515A (with a message of "Driver") in order to indicate to the passenger that the vehicle 520A is associated with the driver requested by the passenger.

Figure 5B:
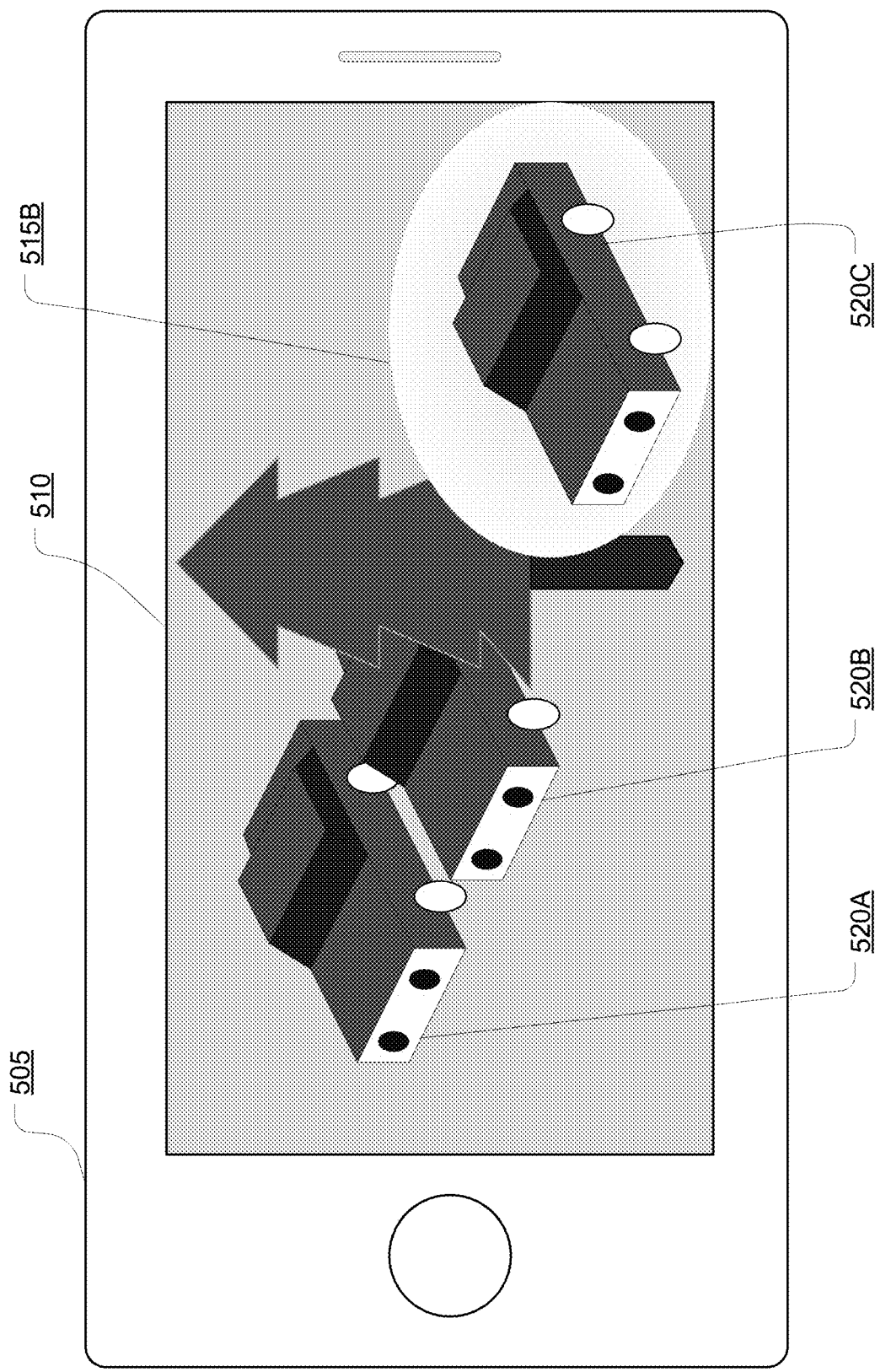
FIG. 5B shows a graphical user interface on the display of a mobile device depicting identification of an arriving vehicle using augmented reality according to some embodiments of the present invention.

FIG. 5B shows a graphical user interface on the display 510 of a mobile device 505 depicting identification of an arriving vehicle using augmented reality according to some embodiments of the present invention. The embodiment of FIG. 5B uses a highlight, a glow, and/or a halo as an indicator 515B. The mobile device 505 may be the mobile device 405 of FIG. 4, the passenger mobile device 230 of FIG. 2, and/or the mobile device 100 of FIG. 1. The display 510 may form part of the device hardware of the mobile device 505, and may be similar to display 268 of FIG. 2 and/or display 410 of FIG. 4.

The display 510 may show an augmented image. The augmented image may include image data corresponding to a real time image captured by the camera (not shown) of the mobile device 505. In the example shown in FIG. 5B, the image data includes three vehicles: vehicle 520A, vehicle 520B, and vehicle 520C. The augmented image may also include augmented data. The augmented data may include an indicator 515B. The indicator 515B includes a circle (or any other shape) highlighting the vehicle 520C. As used herein, the term "highlight" may be used interchangeably with the terms "glow" and/or "halo". A highlight may be any indicator that may distinguish the vehicle 520C from the vehicles 520A and 520B. For example, the highlight of indicator 515B may enhance the colors around the vehicle 520C, may increase contrast around the vehicle 520C, may decrease contrast around the vehicle 520C, and/or may use alternate colors around the vehicle 520C that are not naturally present in the image data. In some examples, the augmented data may include other indicators, alternatively or additionally.

To arrive at the augmented image shown on display 510, a passenger may make a gesture with the mobile device 505 (e.g., raising the mobile device 505 to face the passenger, placing the mobile device 505 in a landscape orientation, activating the camera, combinations thereof, etc.). In response to detecting the gesture, the mobile device 505 may activate an augmented reality mode. Upon activation of the augmented reality mode, a real time image may be shown on display 510.

Based on the image shown in display 510 (and/or based on other data, such as proximity data, as discussed further herein), the mobile device 505 may select augmented data to be shown on the display 510. For example, the mobile device 505 may analyze the image data to identify vehicle 520C based on one or more characteristics of the vehicle reported by the driver of the vehicle. In some embodiments, identifying vehicle 520C may be performed by excluding vehicles 520A and 520B as having the one or more characteristics. The mobile device 505 may display the indicator 515B in order to indicate to the passenger that the vehicle 520C is associated with the driver requested by the passenger.

III. Driver Mode

The driver of a vehicle can benefit from an augmented reality view to identify a location of a soon-to-be passenger. The passenger can provide a visual image or visual description of the passenger or an environment around the passenger. A mobile device (in some embodiments, integrated with or part of the vehicle) of the driver can receive the visual information for indicating the location of the passenger.

As an example, the passenger can provide information about a color of clothing that the passenger is wearing. The driver's mobile device can use image data from a camera to identify a passenger wearing the identified color. Such a mode can be enabled when the driver is within a specified distance of the original location of the request from the user, in some embodiments. When the passenger matches the visual characteristic, that passenger or a location the passenger can be highlighted.

As still another example, the passenger can provide an image of herself. In some embodiments, the passenger may use the camera of her mobile device to take a picture of herself in real time. In some embodiments, the passenger may use the mobile device to select a previously taken picture of herself. The image may be processed to identify characteristics of the passenger (e.g., hair color, color of clothing, etc.).

As another example, the passenger can provide images taken from the pickup location. Such images can be matched to images taken from a camera of the driver's mobile device. When the images match (e.g., using a unique characteristic, such as distinctive signage of a building), the notification can be provided to the driver that the driver is at the pickup location. For instance, a virtual pin can be provided on a display of the driver's mobile device.

A. System of Passenger Device, Server, and Driver Device

Figure 6:
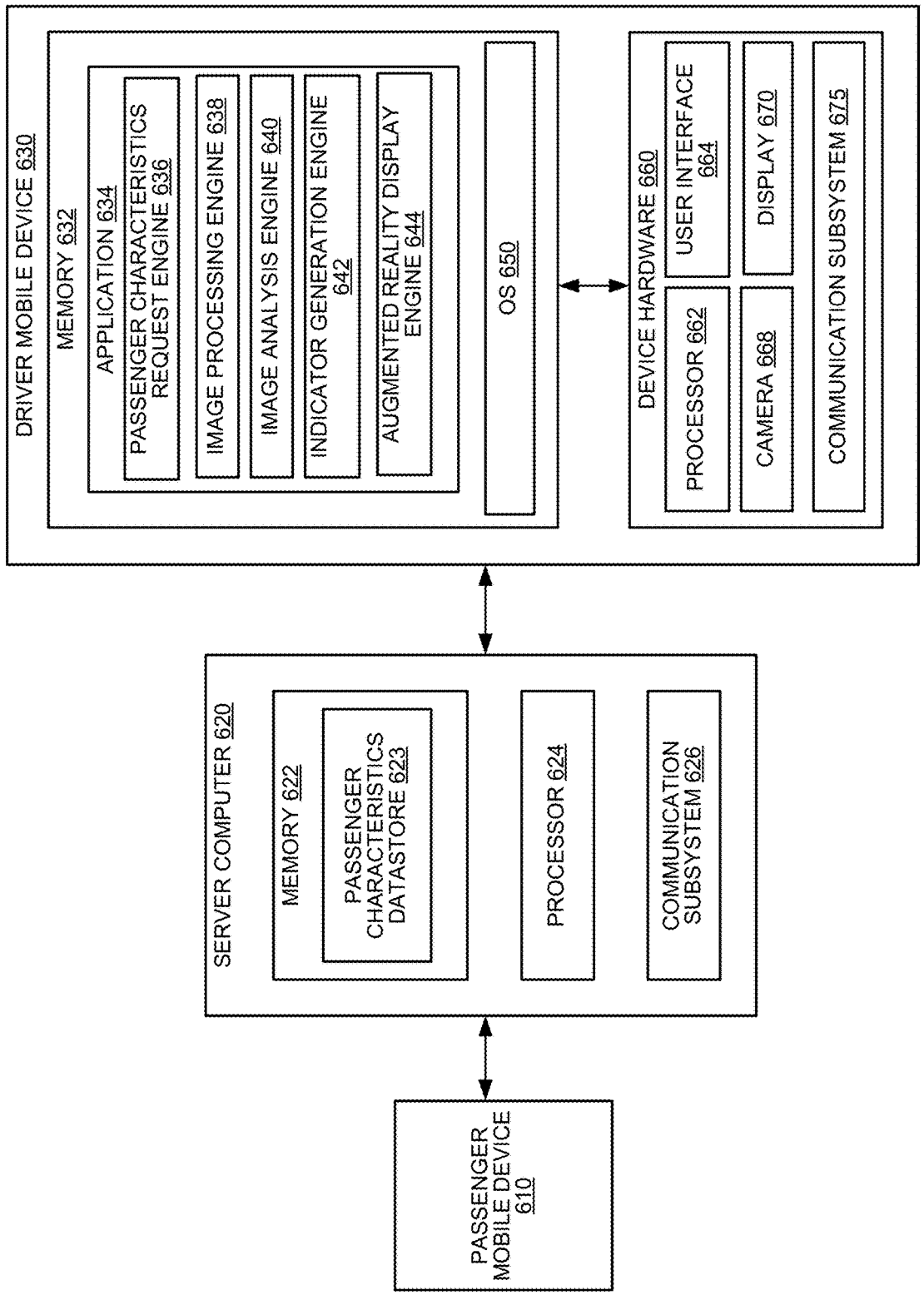
FIG. 6 shows a block diagram depicting an augmented reality system for facilitating identification of a passenger according to some embodiments of the present invention.

FIG. 6 shows a block diagram depicting an augmented reality system for facilitating identification of a passenger according to some embodiments of the present invention. The AR system may include a passenger mobile device 610, a server computer 620, and a driver mobile device 630. Each of the passenger mobile device 610, the server computer 620, and the driver mobile device 630 may be in operative communication with each other, such as over one or more networks. The passenger mobile device 610 and/or the driver mobile device 630 may be a mobile device 100, as described with respect to FIG. 1.

The passenger mobile device 610 may receive input corresponding to passenger characteristics. In some embodiments, based on the type of passenger characteristics, this input may be received as part of an initial registration process of the passenger with the server computer 620, and the passenger characteristics may thereafter be associated with the passenger mobile device 610 for future requested trips. For example, certain passenger characteristics that are unlikely to change may be provided once or less often, such as hair color, height, weight, facial hair, a facial photograph, etc. In the case that the passenger characteristics include information about the environment around the user, this information can be provided once or less often if the passenger mobile device 610 is only used to request transportation from a certain location (e.g., a passenger that walks to work, but takes a taxi home).

In some embodiments, this input may alternatively or additionally be received before each requested trip (or at some other interval) from the passenger mobile device 610. Such embodiments may be desirable, for example, with respect to passengers that change their clothes often (e.g., donning and removing outerwear), wear their hair differently (e.g., up or down, curly or straight, etc.), change their hair color, and/or the like. In the case that the passenger characteristics include information about the environment around the user, this information can be provided regularly or more often if the passenger mobile device 610 is used by the passenger at multiple different locations to request transportation.

The passenger characteristics may include any descriptors of a passenger and/or the environment around the passenger. The passenger characteristics may include a hair color, a hair texture, a hair length, facial hair type, a height, a body type, clothing types, clothing colors, shoe types, shoe colors, accessories, a facial photograph, an environment photograph, landmarks around the passenger, and/or the like. The passenger characteristics may be provided by the passenger mobile device 610 to the server computer 620.

The server computer 620 may include a memory 622, a processor 624, and a communication subsystem 626. The communication subsystem 626 may enable the server computer 620 to communicate with the passenger mobile device 610 and/or the driver mobile device 630. The memory 622 may include a passenger characteristics datastore 623. The passenger characteristics datastore 623 may store the passenger characteristics received from the passenger mobile device 610 in association with a passenger identifier (e.g., a passenger name, a passenger phone number, a passenger e-mail address, etc.) The passenger characteristics datastore 623 may further store and match supplemental characteristics not provided by the passenger mobile device 610. For example, the passenger characteristics datastore 623 may store images of articles of clothing of a variety of different types and colors. These images may be sourced from other passenger mobile devices, the Internet, etc. Thus, a provided textual clothing description (e.g., red T-shirt, blue jean shorts, white tennis shoes) may be supplemented with a sample clothing image. In another example, when the passenger mobile device 610 provides a photograph of the clothing of the passenger to the server computer 620 as passenger characteristics, the processor 624 may execute a matching search of the clothing images in the passenger characteristics datastore 623 in order to identify characteristics of the passenger based on the photograph, such as clothing types and colors.

In some examples, the passenger mobile device 610 may provide the server computer 620 with the state that issued the driver's license and the driver's license number. The server computer 620 may use this information to query one or more remote databases (not shown) storing public records (e.g., records of the Department of Motor Vehicles) in order to obtain supplemental passenger characteristics. For example, the license plate state and number or driver's license state and number may be used by the server computer 620 to obtain a facial photograph of the passenger.

The server computer 620 may be in communication with a driver mobile device 630. The driver mobile device 630 may include a memory 632 and device hardware 660. The device hardware 660 may include a processor 662, a user interface 664, a camera 668, a display 670, and a communication subsystem 675. In some embodiments, the display 670 forms part of the user interface 664. The user interface 664 may further include input elements, such as a keyboard, a trackball, a trackpad, a mouse, a microphone, etc. The communication subsystem 675 may include hardware components configured to allow the driver mobile device 630 to communicate with the server computer 620, such as over a network.

The memory 632 may include an operating system 650. The operating system 650 may provide an interface for a driver to use the driver mobile device 630, e.g., to operate device hardware 660 and to execute application 634. The application 634 may include a plurality of engines for facilitating the AR functions of the driver mobile device 630. For example, the application 634 may include a passenger characteristics request engine 636, an image processing engine 638, an image analysis engine 640, an indicator generation engine 642, and an augmented reality display engine 644. Although shown and described as having a certain number of separate engines, it is contemplated that the application 634 may include a greater or fewer number of engines, and/or that the functions of multiple engines described herein may be combined.

Although not shown in FIG. 6, it is contemplated that the driver mobile device 630 may have a separate transportation request application in communication with the application 634. In some embodiments, the transportation request application may integrate a number of additional engines into the application 634. The transportation request application may allow the driver mobile device 630 to accept a request for transportation from server computer 620 (or another remote server computer). Based on any of a number of factors (e.g., pickup location, destination location, time of request, etc.), the server computer 620 may match the passenger using passenger mobile device 610 to a driver (in this case, the driver using the driver mobile device 630).

In some embodiments, once the passenger has requested a driver (or after the passenger is matched to a driver), the passenger mobile device 610 may be prompted to provide passenger characteristics, as described above. In some embodiments, the driver mobile device 630 may be notified of the match and may transmit a request back to the server computer 620 via the passenger characteristics request engine 636 for the passenger characteristics associated with the matched passenger. The request may include an identifier of the passenger, e.g., a passenger name, a passenger nickname, a passenger user name, a passenger phone number, etc. Server computer 620 may then retrieve the applicable passenger characteristics from the passenger characteristics datastore 623, supplement the passenger characteristics in some embodiments, and transmit the passenger characteristics to the driver mobile device 630 via the communication subsystem 626.

In some embodiments, the passenger mobile device 610, the server computer 620 and/or the driver mobile device 630 may determine that the passenger mobile device 610 and the driver mobile device 630 are within a threshold distance of each other (e.g., fifty feet) indicating arrival. In one example, this determination may be made after a certain period of time has elapsed since the passenger mobile device 610 requested the vehicle (e.g., the expected amount of time for the driver to get to the location of the passenger mobile device 610). In another example, this determination may be made using the locations of the passenger mobile device 610 and/or the driver mobile device 630 (e.g., an entered address, using GPS coordinates, using cell tower triangulation, using proximity sensors, using Bluetooth pings, etc.).

Once the passenger mobile device 610 and the driver mobile device 630 are determined to be within a threshold distance of one another, the driver mobile device 630 may prompt the driver via display 668 to raise the driver mobile device 630 and orient the camera 668 toward the surrounding environment. The camera 668 may then be used to capture image data of the surrounding environment. The image data may be passed to the image processing engine 638. The image data may be transmitted as a single image or as a stream of live images. In some embodiments, the driver mobile device 630 may automatically activate an augmented reality mode and capture image data using the camera 668, without a specific gesture. Such embodiments may be useful, for example, if the driver mobile device 630 is already oriented in a position suitable to use the camera 668, for example, if the driver mobile device 630 is mounted to the dashboard or windshield of the vehicle.

The image processing engine 638 may, in conjunction with the processor 662, receive the image data and process it to identify one or more features. For example, the image processing engine 638 may use outlines, edges and colors to identify separate objects in the image data. In some embodiments, the image processing engine 638 may remove objects that do not correspond to people (e.g., objects that are improperly dimensioned, etc.). In some embodiments, the image processing engine 638 may optimize the image data, such as by adjusting lighting, shadows, sharpness, etc.

The image processing engine 638 may transmit the processed image data to the image analysis engine 640. The image analysis engine 640 may receive the passenger characteristics and analyze the processed image data to search for the characteristics. For example, the image analysis engine 640 may perform comparisons between a facial image received from the passenger characteristics datastore 623 and faces in the processed image data. These comparisons may be made based on particular characteristics of the face (e.g., eye shape, eye color, hair color, hair length, nose shape, mouth shape, etc.), which may be relatively unique to a particular person. In some embodiments, a percentage match may be generated for each person present in the processed image data based on the number of matching characteristics, and the person with the highest percentage match may be identified as the requesting passenger. In some embodiments, a passenger may only be identified if its match percentage is above a certain threshold (e.g., a 70% threshold may mean that a 95% match may be identified, while neither a 40% match nor a 50% match would be identified in another example). Using similar techniques, the image analysis engine 640 may receive characteristics of an environment surrounding the passenger and analyze the processed image data to search for the characteristics (e.g., a particular sign in conjunction with a particular building in the background).

The image analysis engine 640 may identify the matching passenger or environment to the indicator generation engine 642. For example, the image analysis engine 640 may provide pixel addresses in the image data corresponding to the matched passenger. In the case of streaming image data, the image analysis engine 640 may provide a description of characteristics in the image data corresponding to the matched passenger (e.g., red T-shirt with black pants), as the pixel addresses of the matched passenger may change. Once the location of the matched passenger is identified, the indicator generation engine 642 may generate an indicator identifying the matched passenger to be overlaid on the image data. The indicator may include, for example, a text box, an arrow, a bubble, a circle, a highlight, a contrasting color, etc.

In some embodiments, the indicator generation engine 642 may further generate indicators before a matched passenger is identified or when a matched passenger is not identified. For example, the indicator generation engine 642 may generate a text box indicating to the driver that the camera needs to be reoriented in order to identify a matched passenger according to a process similar to that described with respect to FIG. 4. In another example, the indicator generation engine 642 may generate a text box indicating to the driver that no person has been matched in the image data.

The augmented reality display engine 644 may receive the indicator from the indicator generation engine 642, as well as the location of the matched passenger (if a match is found). The augmented reality display engine 644 may overlay the indicator onto the image data at or in proximity to the location of the matched passenger. For example, an arrow may point at the center of the image of the matched passenger, or a circle may be placed around the entirety of the matched passenger.

B. Method for Driver Mode

Figure 7:
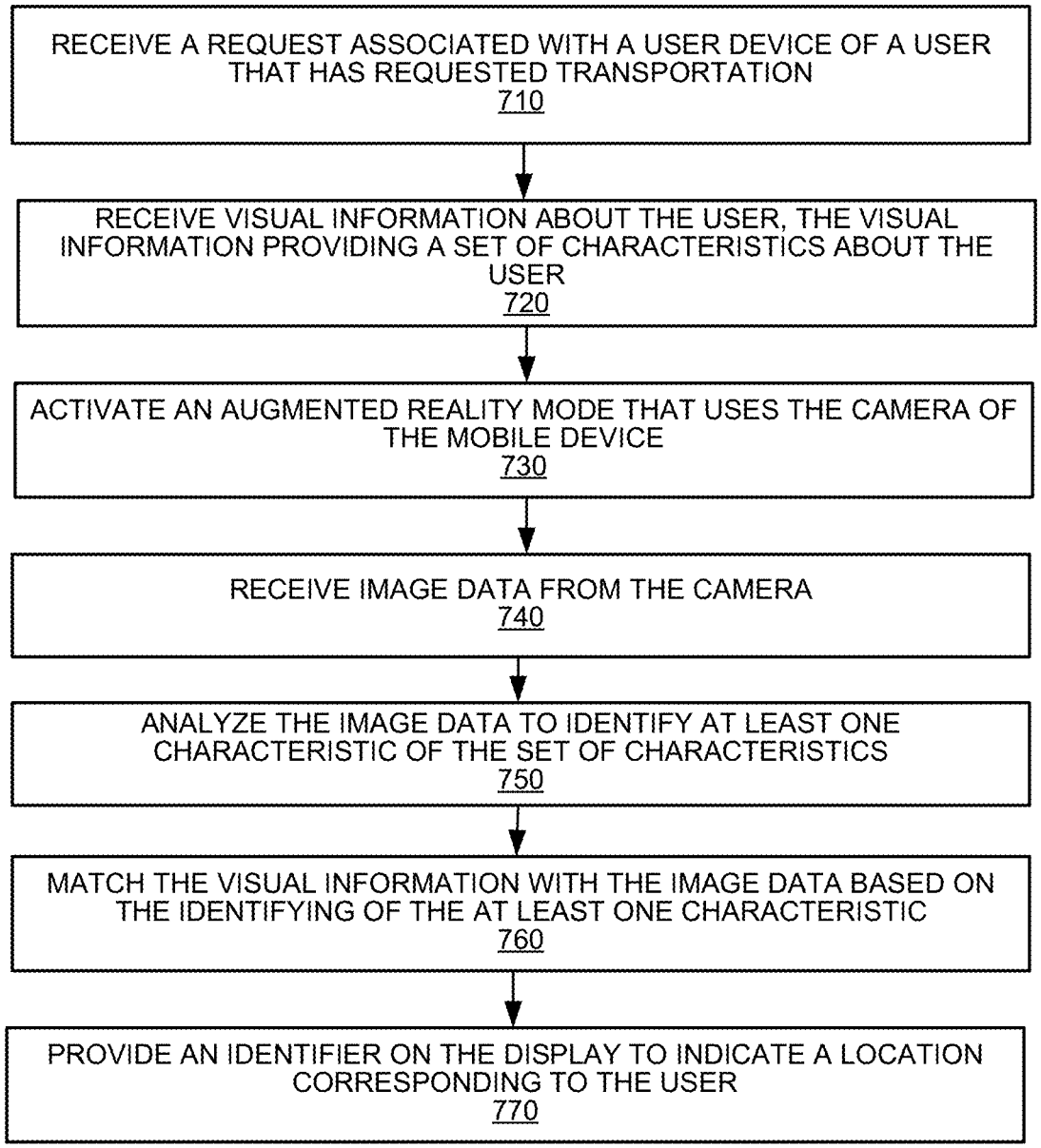
FIG. 7 shows a flowchart depicting a method for facilitating identification of a passenger using augmented reality according to some embodiments of the present invention.

FIG. 7 shows a flowchart depicting a method for facilitating identification of a passenger of an arriving vehicle using augmented reality according to some embodiments of the present invention. The method can be performed by the driver mobile device 630.

At step 710, a request is received associated with a user device of a user that has requested transportation. The "user" referred to with respect to FIG. 7 may alternately refer to a "passenger" as described herein.

At step 720, visual information about the user or an environment around the user is received. The visual information may provide a set of one or more characteristics about the user or the environment around the user. The visual information may include at least one visual characteristic of the user. The visual information may include at least one visual characteristic of the environment around the user.

At step 730, an augmented reality mode is activated to use a camera of a mobile device. In some embodiments, the augmented reality mode may be activated in response to a notification that the vehicle is within a specified distance of a position associated with the user. In some embodiments, the augmented reality mode may be activated in response to one or more other criteria, taken alone or in combination. For example, the augmented reality mode may be activated in response to a gesture or movement of the mobile device (or a series of gestures or movements of the mobile device), in response to a selection of a button on a display or user interface, and/or the like. In some embodiments, the augmented reality mode may be activated by the driver mobile device only when the driver is stopped or parked (e.g., when the GPS and/or the accelerometer of the driver mobile device indicates that the vehicle is stationary).

At step 740, image data is received from the camera of the mobile device. The image data may include a plurality of users. The plurality of users may include the user and one or more other users. In some embodiments, the image data may alternatively or additionally include an environment around the user.

At step 750, the image data is analyzed to identify at least one characteristic of the set of one or more characteristics of the visual information. For example, if the set of one or more characteristics includes a T-shirt logo, the image data may be searched for text corresponding to the logo. If the set of one or more characteristics includes a particular color of pants, the image data may be searched for pants that are that color. If the set of one or more characteristics include a height, the image data may be searched for a user that height, using objects in the scene as a reference point. In some embodiments, the image data is analyzed to search for characteristics of the environment, such as buildings, landmarks, natural features (e.g., mountains, hills, bodies of water, plants, trees, etc.), combinations thereof, and/or the like. Such characteristics of the environment can be provided by the passenger taking one or more photos of the environment around the passenger.

For example, the set of one or more characteristics may include a hair color, a hair style and a jacket color. The hair color and hair style may be identified in the image data. In some embodiments, not all of the set of one or more characteristics may need to be found in the image data. By allowing less than all of the characteristics to be identified, some embodiments may allow for certain differences (e.g., a piece of outerwear being removed, etc.).

At step 760, the visual information is matched with the image data based on the identifying of the at least one characteristic. The visual information may be of a user that is identified in the image data based on the user matching more characteristics of the visual information than other users. The visual information may be of an environment around the user that is identified in the image data based on a specified number of characteristics being identified in the image data.

At step 770, an identifier is provided on the display of the mobile device to indicate a location corresponding to the user. In some embodiments, the identifier provided on the display may be a virtual pin. A virtual pin may be, for example, identifier 815 of FIG. 8.

C. Graphical User Interface

Figure 8:
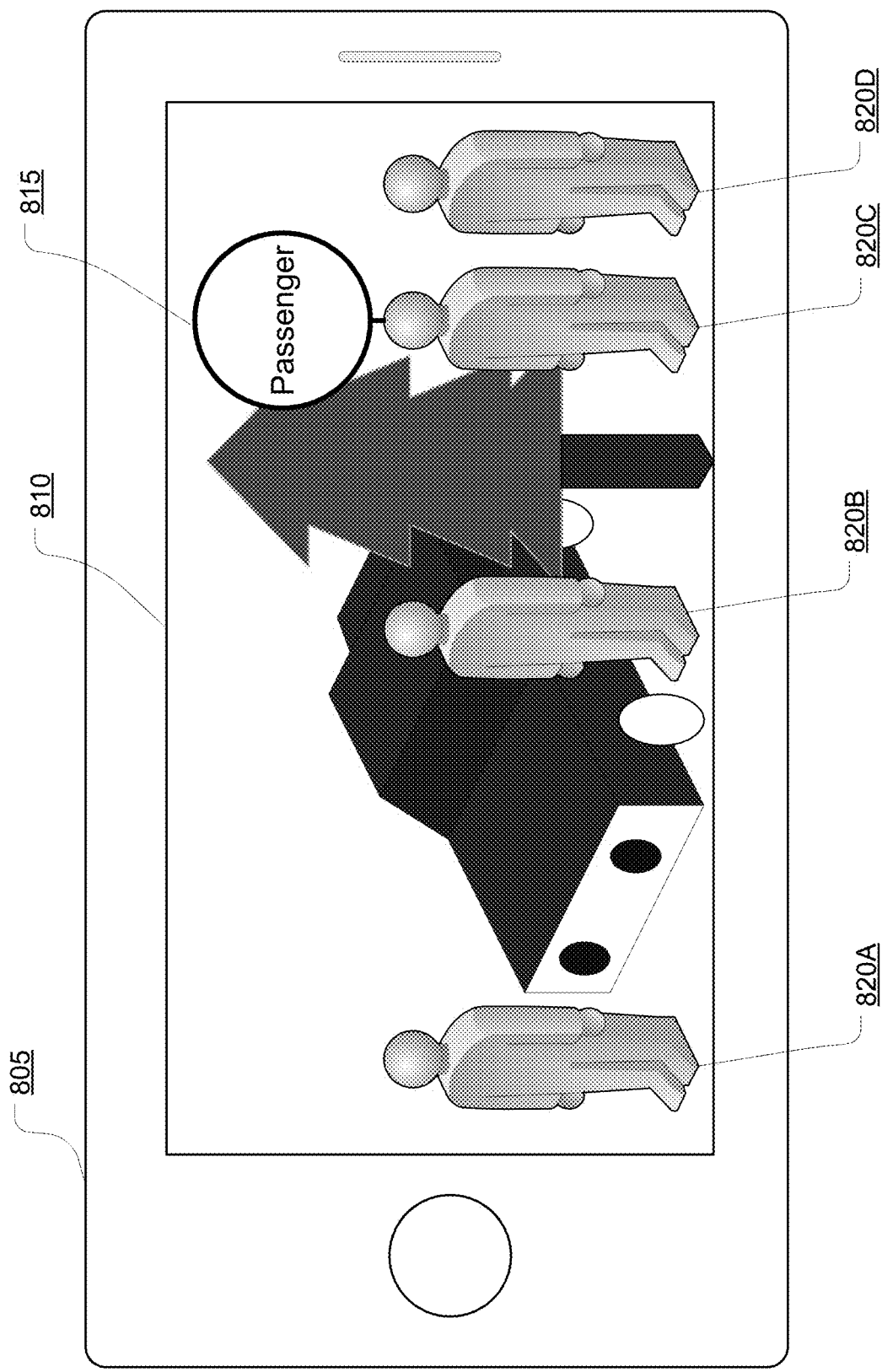
FIG. 8 shows a graphical user interface on the display of a mobile device depicting identification of a passenger using augmented reality according to some embodiments of the present invention.

FIG. 8 shows a graphical user interface on the display 810 of a mobile device 805 depicting identification of a passenger 820C using augmented reality according to some embodiments of the present invention. The mobile device 805 may be the driver mobile device 630 of FIG. 6, and/or the mobile device 100 of FIG. 1. The display 810 may form part of the device hardware of the mobile device 805, and may be similar to display 670 of FIG. 6.

The display 810 may show an augmented image. The augmented image may include image data corresponding to a live, real world image at which the camera (not shown) of the mobile device 805 is pointed. In the example shown in FIG. 8, the image data includes four people: person 820A, person 820B, person 820C, and person 820D. The augmented image may also include augmented data. The augmented data may include an identifier 815. The identifier 815 may include a virtual pin comprising a circle with the text "Passenger" in it and a line connecting the person 820C to the circle. In some examples, the augmented data may include other indicators or identifiers, as discussed further herein.

To arrive at the augmented image shown in display 810, a driver may make a gesture with the mobile device 805 (e.g., raising the mobile device 805 to face the driver, placing the mobile device 805 in a landscape orientation, activating the camera, combinations thereof, etc.). In response to detecting the gesture, the mobile device 805 may activate an augmented reality mode. Upon activation of the augmented reality mode, a live, real world image may be shown on the display 810.

Based on the image shown in display 810 (and/or based on other data, such as proximity data, as discussed further herein), the mobile device 805 may select augmented data to be shown on the display 810. For example, the mobile device 805 may analyze the image data to identify person 820C based on one or more characteristics of the passenger reported by the passenger. In some embodiments, identifying person 820C includes excluding people 820A, 820B, and 820D as having the one or more characteristics. The mobile device 805 may display the indicator 815 (with a message of "Passenger") in order to indicate to the driver that the person 820C is associated with the requesting passenger.

IV. Proximity Mode

In some embodiments, alternative to or additional to the driver mode and passenger mode described above, a proximity mode of a driver mobile device and/or passenger mobile device may be activated to identify a driver and/or a passenger. Activation of a proximity mode on a driver mobile device and a passenger mobile device may cause the mobile devices to exchange pings with each other via a beacon implementing a short range communication protocol when within range. The short range communication protocol may include Bluetooth, Bluetooth LE, radio frequency communications, near field communications, ultra-wideband communications, etc.

Figure 9:
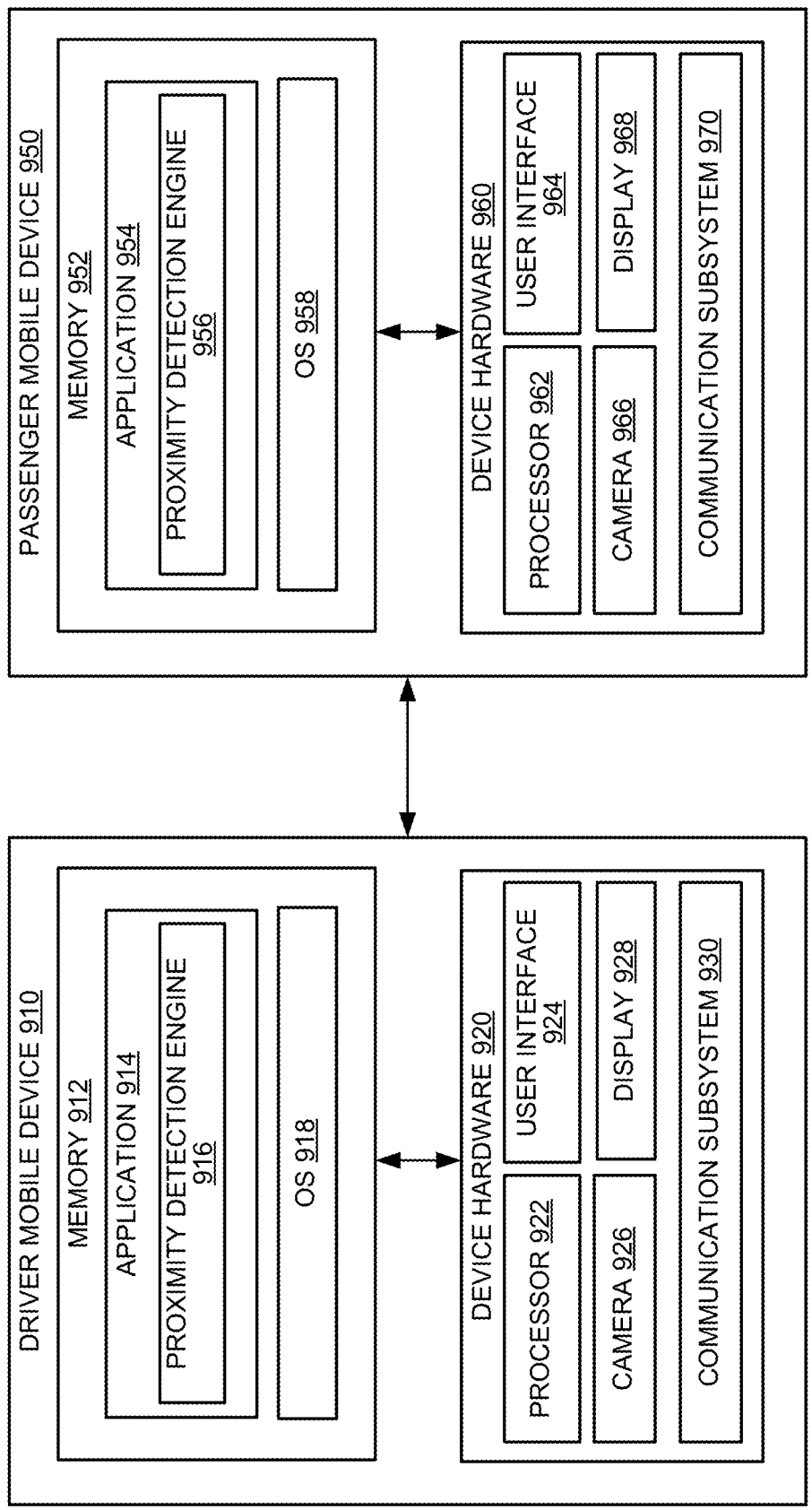
FIG. 9 shows a block diagram depicting an augmented reality system implementing proximity sensing according to some embodiments of the present invention.

FIG. 9 shows a block diagram depicting an augmented reality system implementing proximity sensing according to some embodiments of the present invention. The AR system shown in FIG. 9 may be implemented alternatively or additionally to the AR systems of FIG. 2 and/or FIG. 6. For example, the proximity detection engine 916 may be implemented in the driver mobile device 630 of FIG. 6, and/or the proximity detection engine 956 may be implemented in the passenger mobile device 230 of FIG. 2.

The AR system may include a driver mobile device 910 and a passenger mobile device 950. The driver mobile device 910 and the passenger mobile device 950 may be in operative communication with each other, such as over one or more networks. In some embodiments, the driver mobile device 910 and the passenger mobile device 950 may be in communication with each other via a short range communication protocol. The driver mobile device 910 and/or the passenger mobile device 950 may be a mobile device 100, as described with respect to FIG. 1.

The passenger mobile device 950 may include a memory 952 and device hardware 960. The device hardware 960 may include a processor 962, a user interface 964, a camera 966, a display 968, and a communication subsystem 970. In some embodiments, the display 968 forms part of the user interface 964. The user interface 964 may further include input elements, such as a keyboard, a trackball, a trackpad, a mouse, a microphone, etc. The communication subsystem 970 may include hardware components configured to allow the passenger mobile device 950 to communicate with the driver mobile device 910, such as over a network. In some embodiments, the communication subsystem 970 may include a beacon.

The memory 952 may include an operating system 958. The operating system 958 may provide an interface for a passenger to use the passenger mobile device 950, e.g., to operate device hardware 960 and to execute application 954. The application 954 may include one or more engines for facilitating the AR functions of the passenger mobile device 950. For example, the application 954 may include a proximity detection engine 956.

Similarly, the driver mobile device 910 may include a memory 912 and device hardware 920. The device hardware 920 may include a processor 922, a user interface 924, a camera 926, a display 928, and a communication subsystem 930. In some embodiments, the display 928 forms part of the user interface 924. The user interface 924 may further include input elements, such as a keyboard, a trackball, a trackpad, a mouse, a microphone, etc. The communication subsystem 930 may include hardware components configured to allow the driver mobile device 910 to communicate with the passenger mobile device 950, such as over a network. In some embodiments, the communication subsystem 930 may include a beacon.

The memory 912 may include an operating system 918. The operating system 918 may provide an interface for a driver to use the driver mobile device 910, e.g., to operate device hardware 920 and to execute application 914. The application 914 may include one or more engines for facilitating the AR functions of the driver mobile device 910. For example, the application 914 may include a proximity detection engine 916.

Although not shown in FIG. 9, it is contemplated that the passenger mobile device 950 may have a separate transportation request application in communication with the application 954. In some embodiments, the transportation request application may integrate a number of additional engines into the application 954. The transportation request application may allow the passenger mobile device 950 to transmit a request for transportation to a server computer. Based on any of a number of factors (e.g., pickup location, destination location, availability, time of request, etc.), the server computer may match the passenger using passenger mobile device 950 to a driver (in this case, the driver using the driver mobile device 910).

Similarly, the driver mobile device 910 may have a separate transportation response application in communication with the application 914. In some embodiments, the transportation response application may integrate a number of additional engines into the application 914. The transportation response application may allow the driver mobile device 910 to transmit a response to a request for transportation to a server computer, once the server computer matches the driver to a request. If the response indicates that the transportation request is accepted, the driver mobile device 910 may be provided with the location of the passenger mobile device 950 (or a separate pick-up location).

In some embodiments, once the transportation request has been accepted, the proximity detection engine 916 (in conjunction with the communication subsystem 930) and/or the proximity detection engine 956 (in conjunction with the communication subsystem 970) may begin to transmit short range communication data pings intended for the other device. Once the devices come within short range communication range of each other (e.g., within 50 feet), the data pings will be received, and it will be determined that the driver mobile device 910 and the passenger mobile device 950 are in proximity to each other. In addition, in some embodiments, the distance between the driver mobile device 910 and the passenger mobile device 950 may be determined based on, for example, signal strength of the data pings. In some embodiments, the relative position of the driver mobile device 910 with respect to the passenger mobile device 950 may be determined based on a direction of receipt of the data pings (e.g., as illustrated in FIG. 4).

In some embodiments, to conserve energy, the proximity detection engine 916 (in conjunction with the communication subsystem 930) and/or the proximity detection engine 956 (in conjunction with the communication subsystem 970) may not immediately begin to transmit data pings intended for the other device once the transportation request has been accepted. Instead, the driver mobile device 910 and/or the passenger mobile device 950 may determine that the driver mobile device 910 and the passenger mobile device 950 should be within a threshold distance of each other (e.g., fifty feet). In one example, this determination may be made after a certain period of time has elapsed since the driver mobile device 910 accepted the transportation request (e.g., the expected amount of time for the driver to get to the location of the passenger mobile device 950). In another example, this determination may be made using the locations of the driver mobile device 910 and/or the passenger mobile device 950 (e.g., an entered address, using GPS coordinates, using cell tower triangulation, etc.).

Once the devices should be in short range communication range of each other based on this information, the data pings may begin to be transmitted. Once within range, the data pings will be received, and it can be determined that the driver mobile device 910 and the passenger mobile device 950 are in proximity to each other. In addition, in some embodiments, the distance between the driver mobile device 910 and the passenger mobile device 950 may be determined using, for example, signal strength of the data pings. In some embodiments, the relative position of the driver mobile device 910 with respect to the passenger mobile device 950 may be determined based on a direction of receipt of the data pings.

Once the driver mobile device 210 and the passenger mobile device 230 are determined to be in proximity to one another, the passenger mobile device 950 may prompt the passenger via display 968 to raise the passenger mobile device 950 and orient the camera 966 toward the surrounding environment. The camera 966 may then be used to capture image data of the surrounding environment. In some embodiments, the image data may be analyzed to identify the arriving vehicle, as described further herein. Similarly, the driver mobile device 910 may prompt the driver via display 928 to raise the driver mobile device 910 and orient the camera 926 toward the surrounding environment. The camera 926 may then be used to capture image data of the surrounding environment. The image data may be analyzed to identify the requesting passenger, as described further herein. In some embodiments, the position of the arriving vehicle may be determined from the pings. The image data may then be analyzed to determine that position within the image data. For example, the pings may indicate that the vehicle is thirty feet northwest of the passenger mobile device 230. Thus, when the passenger mobile device 230 is oriented in a northwest direction, the image data may be modified to include an indicator approximately forty feet from the mobile device.

V. Other Applications

Although described with respect to identification of a driver and passenger in conjunction with transportation request applications, some embodiments of the invention may be implemented in other contexts as well. Some embodiments may be used to identify a public transportation vehicle (e.g., a bus, a train, a subway, a light rail, etc.). For example, some embodiments of the invention may be used to identify a bus for a passenger to board at a bus stop. Frequently, bus stops use multiple buses to service a single bus stop positioned along multiple different routes. Thus, it may be difficult for a passenger to remember which bus to board and to identify the bus to board. According to some embodiments, a passenger may enter a bus number or route using a keyboard, touch screen display, microphone, or other input device, into a transportation identification application (which may be separate from or combined with the transportation request application and/or a map application). In some embodiments, a passenger may purchase a bus fare using his mobile device, and the bus number or route may be automatically populated into the transportation identification application. In some embodiments, a passenger may enter a destination into a map application and the map application may identify a public transportation mode and route. The public transportation mode and route (including, e.g., a bus number, train number, etc.) may be automatically populated into the transportation identification application.

In some embodiments, when a bus approaches the bus stop, the passenger may point the camera of the mobile device at the bus to capture image data including the bus. The mobile device may search the image data for the bus number or route. If the bus number or route is present on the bus, the mobile device may display an indicator showing the correct bus to the passenger.

In some embodiments, a multi-modal route may be implemented. For example, a passenger may enter a destination into a map application, and the map application may instruct the user to walk 0.3 miles to a bus station, then board a particular bus. In some embodiments, the AR mode of the transportation identification application may be activated automatically. For example, the AR mode may be activated upon the passenger's arrival at the bus stop (e.g., based on detected GPS coordinates from the mobile device, based on passage of the predicted amount of time to walk to the bus stop, etc.). In another example, the AR mode may be activated according to a schedule of the bus (e.g., at the scheduled arrival time of the bus at the bus stop). In some embodiments, the AR mode of the transportation identification application may be manually activated by the passenger, such as by making a gesture or selecting a button the user interface, as described further herein.

In another example, some embodiments of the invention may be used to identify a train for a passenger to board at a train station. Frequently, train stations house several trains with several different destinations at the same time. It may be difficult for a passenger to remember which train to board and to identify which platform to go to. Further, if the passenger were to get on the wrong train, the passenger could be displaced far from the intended destination. Thus, some embodiments facilitate a passenger's identification of the proper train and/or platform. In some embodiments, a passenger may enter a train number, platform number or destination using a keyboard, touch screen display, microphone, or other into device, into an application. In some embodiments, a passenger may purchase a train ticket using her mobile device, and the train number, platform number, and/or destination may be automatically populated into the application. If only some of this information is populated into the application (e.g., train number), but further information is desirable for identification (e.g., platform number), the application may search a networked database for the supplemental information (e.g., using a website maintained by the train operator).

When at the train station, the passenger may point the camera of the mobile device at the various platforms and trains to capture image data. The mobile device may search the image data for the platform number, train number, destination, etc. If this information is present in the image data, the mobile device may display an indicator identifying the proper train or platform to the passenger. In some embodiments, the mobile device may display further supplemental information from the networked database, such as schedule information, the real time location of the train, stop information, destination information (e.g., weather conditions, traffic conditions, etc.), and/or the like.

In some embodiments, the image data may not include the desired information (e.g., platform number, train number, destination, etc.). However, the mobile device may be able to infer where the passenger should move or orient the camera in order to capture the desired information and be at the proper location. For example, if the desired train is on platform 4, but the image data shows platform 5 on the left and platform 6 on the right, the mobile device may infer that platform 4 is to the left of platform 5 and direct the passenger in that direction using an arrow or other indicator. In another example, if the desired train is not viewable from the passenger's current location, the mobile device may use publicly available images of the train station and/or maps of the train station to direct the passenger to a location at which the train is viewable and can be identified by the mobile device.

In still another example, some embodiments of the invention may be used to identify a destination (e.g., a coffee shop). A user may use his mobile device to generate image data of his surroundings. The image data may be used to determine an approximate location of the user. The approximate location of the user may be used, in turn, to locate the nearest coffee shop, such as by using a publicly available map and/or business directory service. The mobile device may display one or more indicators on the mobile device directing the user toward the location of the coffee shop. When the coffee shop is located within the image data (e.g., by searching the image data for text corresponding to the name of the coffee shop), an indicator may be associated with the coffee shop and displayed (e.g., a virtual pin).

In some embodiments, the desired vehicle, bus, train, or destination may not be visible to the user (or included in the image data) by virtue of one or more visual obstacles, such as a wall, a house, a building, a tree, or any other object. In some embodiments, the mobile device may render the visual obstacle as transparent or translucent. Thus, the indicator of the desired vehicle, bus, train, or destination may be seen by the user on the other side of the visual obstacle, and the user may understand that he must go around the obstacle.

VI. Example Device

Figure 10:
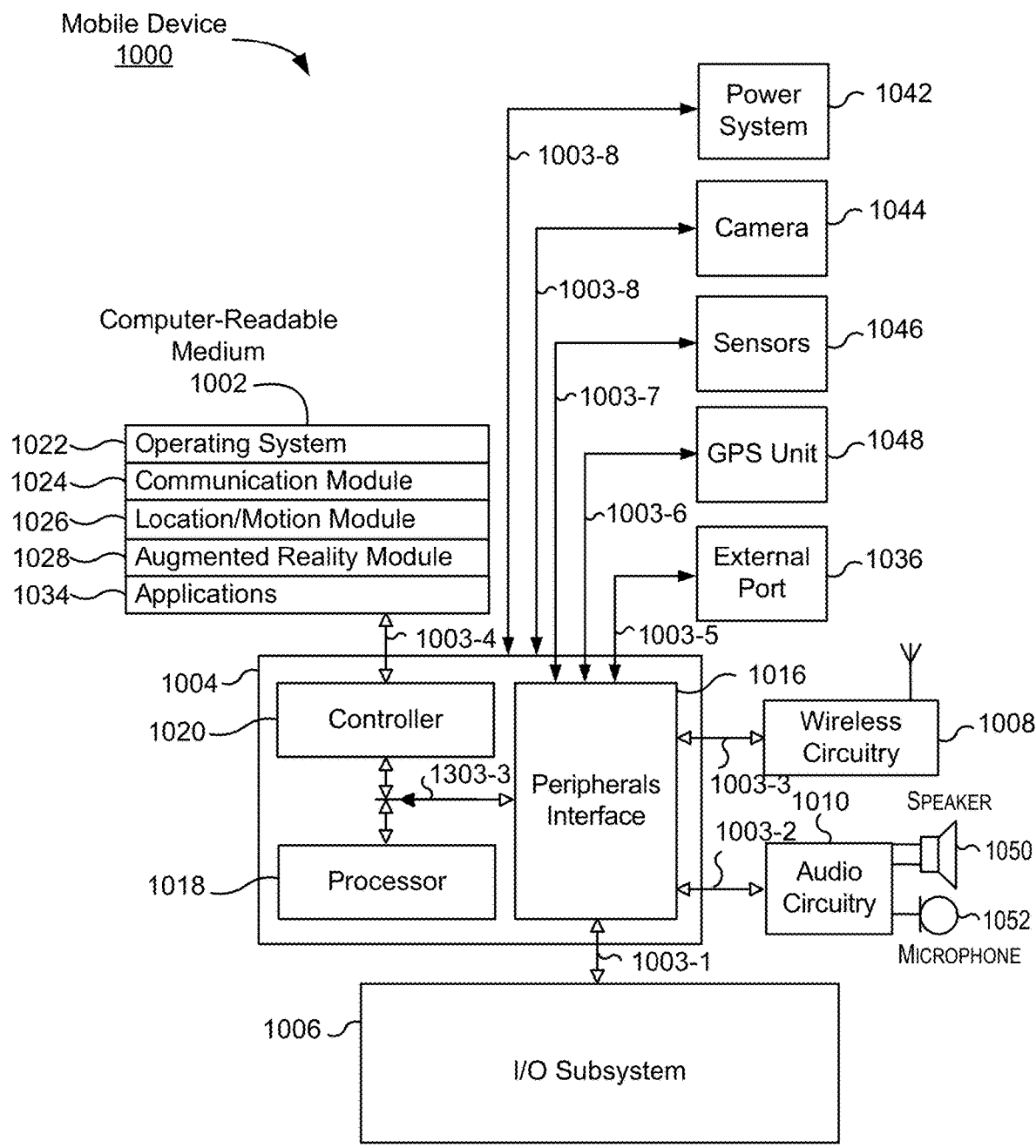
FIG. 10 is a block diagram of an example device, which may be a mobile device, according to some embodiments of the present invention.

FIG. 10 is a block diagram of an example device 1000, which may be a mobile device as described herein. Device 1000 generally includes computer-readable medium 1002, a processing system 1004, an Input/Output (I/O) subsystem 1006, wireless circuitry 1008, and audio circuitry 1010 including speaker 1050 and microphone 1052. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1008 can use various protocols, e.g., as described herein.

Wireless circuitry 1008 is coupled to processing system 1004 via peripherals interface 1016. Interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on medium 1002.

Peripherals interface 1016 couple the input and output peripherals of the device to processor 1018 and computer-readable medium 1002. One or more processors 1018 communicate with computer-readable medium 1002 via a controller 1020. Computer-readable medium 1002 can be any device or medium that can store code and/or data for use by one or more processors 1018. Medium 1002 can include a memory hierarchy, including cache, main memory and secondary memory.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. In some embodiments, device 1000 includes sensors 1046. Sensors 1046 can include accelerometers, compasses, gyroscopes, pressure sensors, audio sensors, light sensors, barometers, and the like. Sensors 1046 can be used to sense location aspects, such as auditory or light signatures of a location.

In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in medium 1002 to perform various functions for device 1000. In some embodiments, the software components include an operating system 1022, a communication module (or set of instructions) 1024, a location module (or set of instructions) 1026, an augmented reality module 1028 that implements an augmented reality mode as described herein, and other applications (or set of instructions) 1034.

Operating system 1022 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. External port 1036 (e.g., USB, FireWire, Lightning connector, 60-pin connector, etc.) is adapted for coupling directly to other devices or indirectly over a network (e.g., the Internet, wireless LAN, etc.).

Location/motion module 1026 can assist in determining the current position (e.g., coordinates or other geographic location identifiers) and motion of device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1026 receives data from GPS unit 1048 and analyzes the signals to determine the current position of the mobile device. In some embodiments, location/motion module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to location/motion module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1300 based on the position coordinates of the corresponding transmitters. Regardless of the specific location technology used, location/motion module 1026 receives information from which a location fix can be derived, interprets that information, and returns location information, such as geographic coordinates, latitude/longitude, or other location fix data.

The augmented reality module 1028 can activate automatically or in response to a gesture, movement, and/or selection on a user interface. Once activated, the augmented reality module 1028 may capture image data using the camera 1044. The augmented reality module 1028 can determine whether a particular object (e.g., a hired vehicle, a particular passenger, a particular environment, etc.) is present in the image data, and overlay an indicator onto the image data to be displayed on the mobile device 1000, as described further herein.

The one or more applications programs 1034 on the mobile device can include any applications installed on the device 1000, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1006 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or track pad. In some embodiments, I/O subsystem 1006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" element does not necessarily require that a second element be provided. Moreover reference to a "first" or a "second" element does not limit the referenced element to a particular location unless expressly stated.

All patents, patent applications, publications, and descriptions mentioned herein are incorporated by reference in their entirety for all purposes. None is admitted to be prior art.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not taught to be exhaustive or to limit the embodiments to the precise forms disclosed. Many modifications and variations are possible in view of the above teachings.

What is claimed is:

1. A mobile device comprising:
   a display;
   a camera communicably coupled with the display;
   a processor; and
   a memory coupled to the processor, the memory storing instructions, which when executed by the processor, cause the mobile device to perform operations including:
      storing, in the memory of the mobile device, vehicle information about a specific vehicle for a user of the mobile device, the vehicle information providing a set of one or more physical characteristics of the specific vehicle;
      receiving a notification from a driver device that the specific vehicle is arriving, the notification enabling Augmented Reality (AR) mode;
      in response to a gesture received from the user at the mobile device, causing the display to provide the AR mode;
      after storing the vehicle information, capturing image data using the camera of the mobile device in the AR mode;
      receiving the image data from the camera, the image data including the specific vehicle;
      analyzing the image data using an image processing engine to identify at least one physical characteristic of the set of one or more physical characteristics of the specific vehicle that are stored in the memory to identify the at least one physical characteristic;
      identifying the specific vehicle using an image analysis engine by comparing the at least one physical characteristic in the image data to the one or more physical characteristics of the specific vehicle that are stored in the memory; and
      providing, on the display of the mobile device, an indication of the specific vehicle.

2. The mobile device of claim 1, wherein the gesture includes movement of the mobile device from a horizontal position to a vertical position.

3. The mobile device of claim 1, wherein the set of the one or more physical characteristics includes multiple characteristics, and wherein at least one of the multiple characteristics is selected from: a make of the specific vehicle, a model of the specific vehicle, or a type of the specific vehicle.

4. The mobile device of claim 1, wherein the operations further include:
   submitting, via an application stored in the memory and executing on the mobile device, a request for the specific vehicle of a plurality of vehicles via a network connection of the mobile device, wherein the plurality of vehicles includes the specific vehicle; and
   receiving, via the application, the one or more physical characteristics of the specific vehicle.

5. The mobile device of claim 1, wherein the image data from the camera includes a plurality of vehicles, wherein the plurality of vehicles includes the specific vehicle and one or more other vehicles, and wherein identifying the specific vehicle using the at least one physical characteristic includes selecting the specific vehicle from among the plurality of vehicles based on the at least one physical characteristic, wherein the at least one physical characteristic corresponds to the specific vehicle and not to the one or more other vehicles.

6. The mobile device of claim 1, wherein the specific vehicle includes a public transportation vehicle.

7. The mobile device of claim 6, wherein the operations further include:
   retrieving a schedule corresponding to the public transportation vehicle, wherein an augmented reality mode is activated automatically based on the schedule.

8. The mobile device of claim 1, wherein the operations further include:
   receiving user input corresponding to a destination; and
   generating a route to the destination, wherein generating the route includes identifying the set of one or more physical characteristics of the specific vehicle, wherein the specific vehicle is a public transportation vehicle, and wherein the route includes a public transportation station.

9. The mobile device of claim 8, wherein an augmented reality mode is activated automatically upon detection of the mobile device at the public transportation station.

10. The mobile device of claim 8, wherein the route is multi-modal.

11. The mobile device of claim 1, wherein the operations further include:
   receiving user input corresponding to a selection of a fare; and
   retrieving a set of secondary characteristics of the specific vehicle corresponding to the fare, wherein the specific vehicle is a public transportation vehicle.

12. The mobile device of claim 1, wherein the indication comprises at least one of a group consisting of: highlighting the specific vehicle on the display, an arrow pointing at the specific vehicle on the display, enhancing one or more colors around the specific vehicle, increasing contrast around the specific vehicle, displaying the specific vehicle in color while a background is in black and white, and displaying a glow or halo around the specific vehicle.

13. The mobile device of claim 1, wherein the one or more physical characteristics of the specific vehicle comprise one or more of: a body style, a vehicle color, a body molding, a license plate state, and a license plate number.

14. The mobile device of claim 1, removing one or more objects in the image data that do not correspond to vehicles.

15. The mobile device of claim 1, wherein the analyzing is limited only to one or more objects in the image data that corresponds to vehicles.

16. A method of providing an augmented view on a display of a mobile device to identify an arriving vehicle, the method comprising performing, by the mobile device having a camera communicably coupled with the display:
   storing, in a memory of the mobile device, vehicle information about a specific vehicle for a user of the mobile device, the vehicle information providing a set of one or more physical characteristics of the specific vehicle;
   receiving a notification from a driver device that the specific vehicle is arriving, the notification enabling Augmented Reality (AR) mode;

in response to a gesture received from the user at the mobile device, causing the display to provide the AR mode;
after storing the specific vehicle information, capturing image data using the camera of the mobile device in the AR mode;
receiving the image data from the camera, the image data including the specific vehicle;
analyzing the image data using an image processing engine to identify at least one physical characteristic of the set of one or more physical characteristics of the specific vehicle that are stored in memory to identify at least one physical characteristic of the specific vehicle;
identifying the specific vehicle using an image analysis engine by comparing the at least one physical characteristic in the image data and the set of the one or more stored physical characteristics of the specific vehicle that are stored in the memory; and
providing, on the display of the mobile device, an indication of the specific vehicle.

17. A mobile device comprising:
a display;
a camera communicably coupled with the display;
a processor; and
a memory coupled to the processor, the memory storing instructions, which when executed by the processor, cause the mobile device to perform operations including:
receiving a request associated with a user device of a user that has requested transportation;
receiving visual information about an environment around the user, the visual information providing a set of one or more physical characteristics about the user and the environment around the user;
storing, in the memory of the mobile device, the set of one or more physical characteristics about the user and the environment around the user in the memory of the mobile device;
receiving a notification that the mobile device is arriving a location for the user, the notification enabling Augmented Reality (AR) mode;
in response to a gesture received at the mobile device, causing the display to provide the AR mode;
after storing the visual information, capturing image data using the camera of the mobile device;
receiving the image data from the camera of the mobile device in the AR mode;
removing one or more objects in the image data that do not correspond to people;
analyzing the image data using an image processing engine to identify at least one physical characteristic of the set of one or more physical characteristics of the visual information;
matching the visual information with the image data based on the identifying of the at least one physical characteristic; and
providing an identifier on the display of the mobile device to indicate a location corresponding to the user.

18. The mobile device of claim 17, wherein the visual information includes at least one visual characteristic of the user, wherein the image data includes a plurality of persons, wherein the plurality of persons includes the user and at least one other person, and wherein the matching determines that the user matches more visual characteristics of the visual information than the at least one other person.

19. The mobile device of claim 17, wherein the visual information includes at least one visual characteristic of the environment around the user, and wherein matching the visual information with the image data includes:
determining whether at least a specified number of the at least one visual characteristic of the environment around the user are identified within the image data.

20. The mobile device of claim 17, wherein the operations further include:
receiving a notification that the mobile device is within a specified distance of the location corresponding to the user; and
activating an augmented reality mode in response to the notification.

21. The mobile device of claim 17, wherein the identifier provided on the display is a virtual pin.

22. The mobile device of claim 17, further comprises:
receiving visual information about the user, the visual information providing a set of one or more physical characteristics about the user;
storing, in the memory of the mobile device, the set of one or more physical characteristics about the user in the memory of the mobile device;
after storing the visual information, capturing image data using the camera of the mobile device;
receiving the image data from the camera of the mobile device;
analyzing the image data using an image processing engine to identify at least one physical characteristic of the set of one or more physical characteristics of the visual information;
matching the visual information with the image data based on the identifying of the at least one physical characteristic; and
providing an identifier on the display of the mobile device to indicate a location corresponding to the user.

23. A method of providing an augmented view on a display of a mobile device associated with an arriving vehicle, the method comprising performing, by the mobile device having a camera communicably coupled with the display:
receiving a request associated with a user device of a user that has requested transportation;
receiving visual information about the user and an environment around the user,
the visual information providing a set of one or more physical characteristics about the user and the environment around the user;
storing, in a memory of the mobile device, the set of one or more physical characteristics about the user and the environment around the user in a memory of the mobile device;
receiving a notification that the mobile device is arriving a location for the user, the notification enabling Augmented Reality (AR) mode;
in response to a gesture received from the mobile device, causing the display to provide the AR mode;
after storing the visual information, capturing image data using the camera of the mobile device;
receiving the image data from the camera of the mobile device in the AR mode;
removing one or more objects in the image data that do not correspond to people;
analyzing the image data using an image processing engine to identify at least one physical characteristic of the set of one or more physical characteristics of the visual information;

matching the visual information with the image data based on the identifying of the at least one physical characteristic; and providing an identifier on the display of the mobile device to indicate a location corresponding to the user.

* * * * *